(12) United States Patent
Shishido et al.

(10) Patent No.: US 7,460,714 B2
(45) Date of Patent: *Dec. 2, 2008

(54) METHOD AND APPARATUS FOR MEASURING DIMENSION USING ELECTRON MICROSCOPE

(75) Inventors: Chie Shishido, Yokohama (JP); Mayuka Iwasaki, Yokohama (JP); Hiroki Kawada, Tsuchiura (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/785,790

(22) Filed: Apr. 20, 2007

(65) Prior Publication Data

US 2007/0286494 A1 Dec. 13, 2007

Related U.S. Application Data

(63) Continuation of application No. 11/322,560, filed on Jan. 3, 2006, now Pat. No. 7,269,287.

(30) Foreign Application Priority Data

Oct. 25, 2005 (JP) .............................. 2005-309692

(51) Int. Cl.
G06K 9/46 (2006.01)
G01N 23/00 (2006.01)

(52) U.S. Cl. .................. 382/207; 382/108; 382/141; 382/218; 250/311

(58) Field of Classification Search .................. 382/108, 382/141–152, 207, 217, 218; 250/306, 307, 250/310, 311
See application file for complete search history.

(56) References Cited

U.S. PATENT DOCUMENTS

| 5,568,563 | A | 10/1996 | Tanaka et al. |
| 5,949,901 | A | 9/1999 | Nichani et al. |
| 6,556,703 | B1 | 4/2003 | Kane et al. |
| 6,608,920 | B1 | 8/2003 | Su et al. |
| 6,925,202 | B2 | 8/2005 | Karklin et al. |
| 6,937,753 | B1 | 8/2005 | O'Dell et al. |
| 2005/0247860 | A1 | 11/2005 | Shishido et al. |

FOREIGN PATENT DOCUMENTS

JP 55-072807 6/1980

OTHER PUBLICATIONS

A Simulation Study of Repeatability and Bias in the CD-SEM; J.S. Villarrubia et al; National Institute of Standards and Technology; pp. 138-149.
Askary, Farid and Sullivan, Neal T., *Redefining Critical in Critical Dimension Metrology, Metrology, Inspection, and Process Control for Microlithography XV*, Proceedings of SPIE, vol. 4344 (2001).

*Primary Examiner*—Aaron W Carter
(74) *Attorney, Agent, or Firm*—Antonelli, Terry, Stout & Kraus, LLP.

(57) ABSTRACT

Disclosed is a scanning electron microscope (SEM) for realizing high-precision dimension measurement of a sample, such as an ArF exposure photoresist, that requires the measurement of a dimension by a low S/N signal waveform. To this end, partial waveforms (or partial images) of sample signal waveforms (or an images) acquired from a dimension measurement target sample and a sample material of the same kind are registered in advance, a measurement target signal waveform (or an image) obtained from the dimension measurement target sample and the sample registration waveform are combined, and a dimension of the dimension measurement target pattern is calculated based on the combination result.

15 Claims, 18 Drawing Sheets

FIG.3
(a)
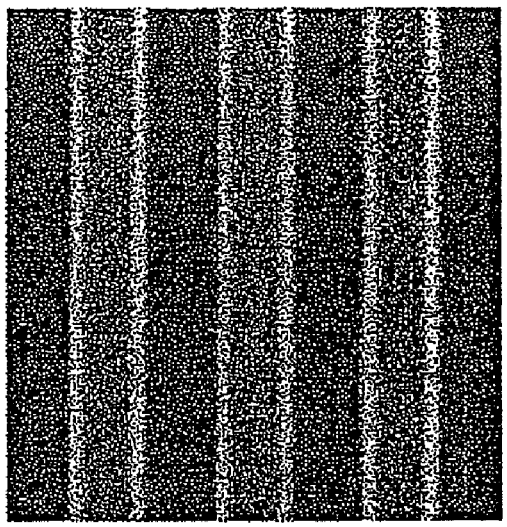 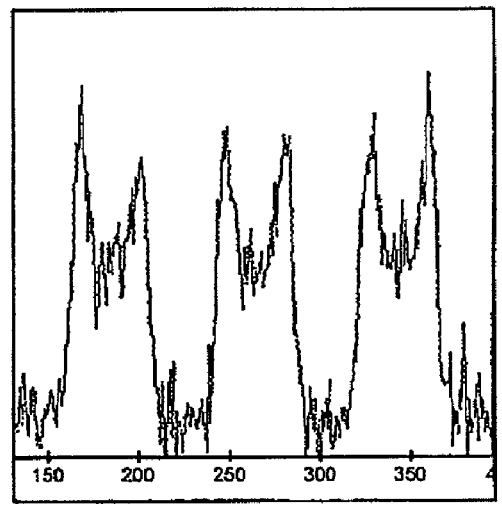
(b)
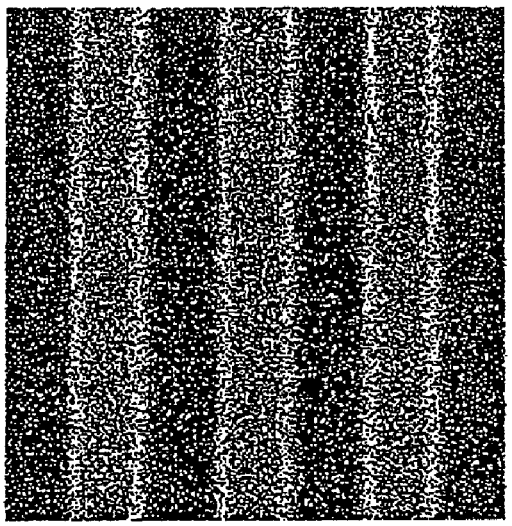 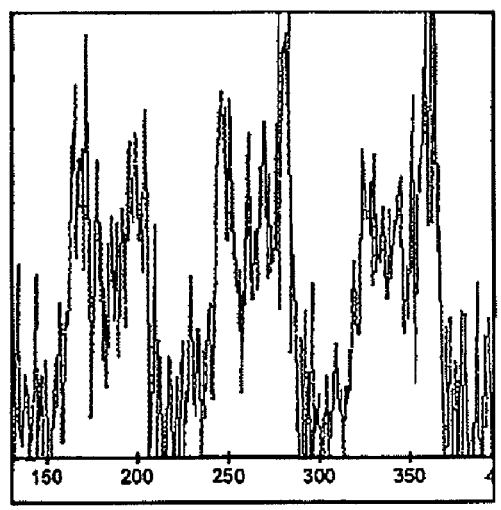

(a) original waveform (b) σ = 2 pixel equalization by gauss filter (c) σ = 4 pixel equalization by gauss filter (d) σ = 6 pixel equalization by gauss filter

FIG.11
(a)
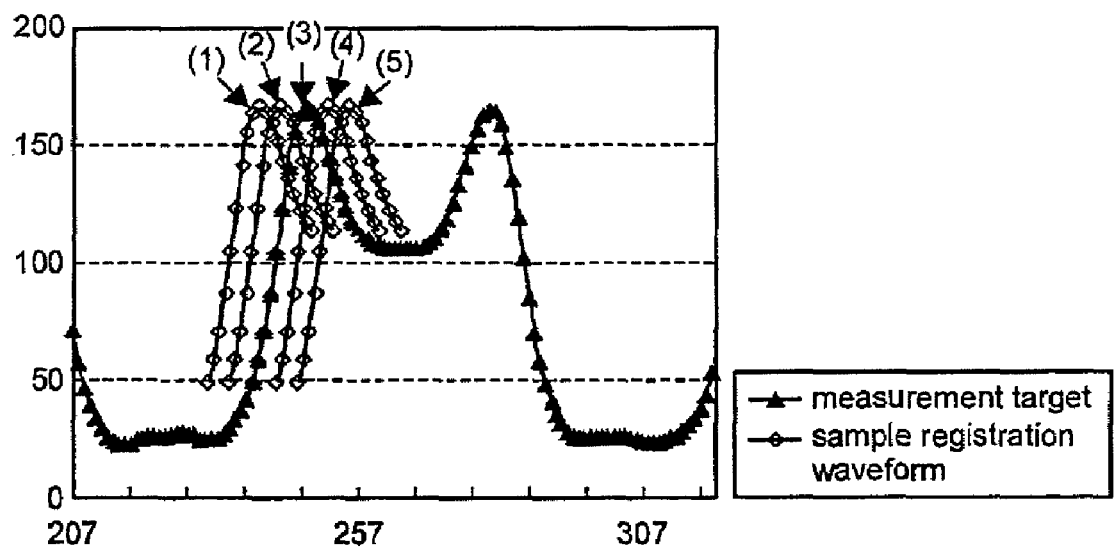
(b)
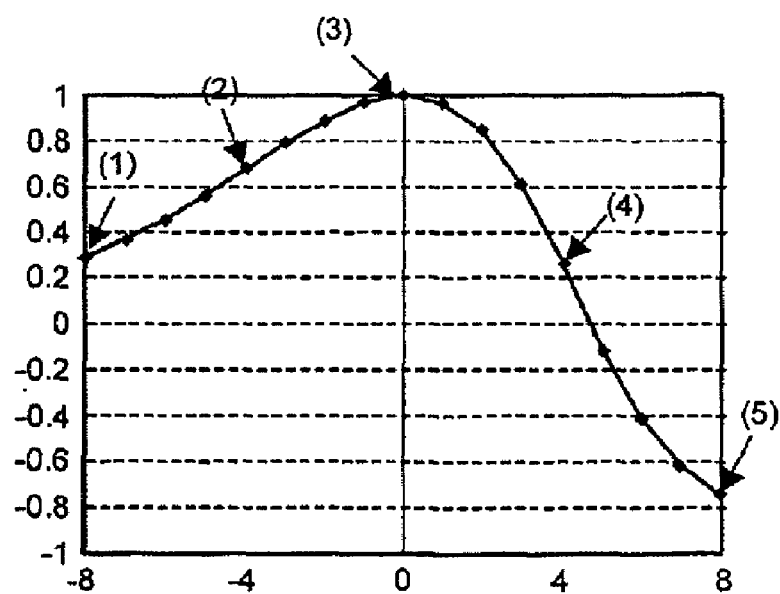

FIG. 14
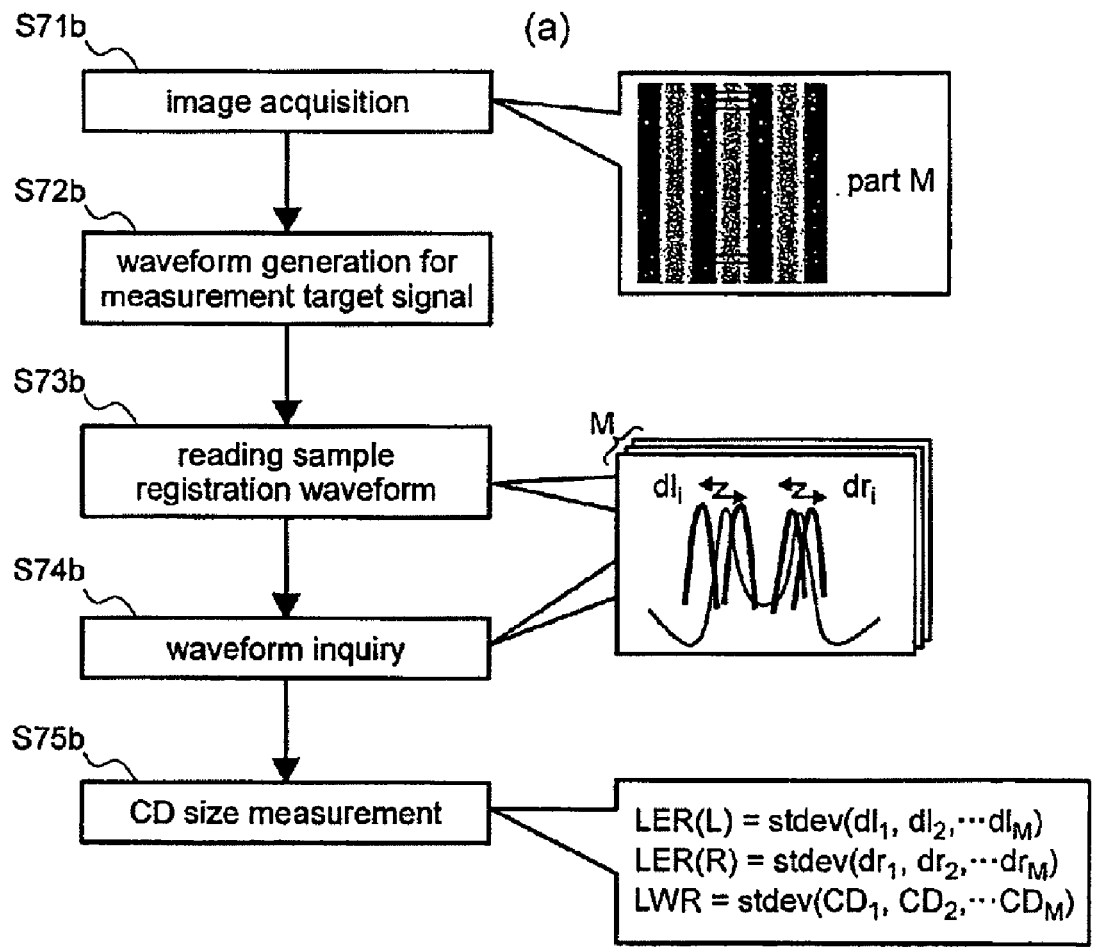
(a)
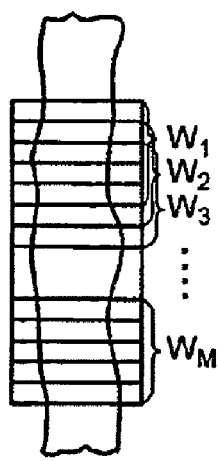
(b)

METHOD AND APPARATUS FOR MEASURING DIMENSION USING ELECTRON MICROSCOPE

CROSS REFERENCE TO RELATED APPLICATION

This application is a Continuation of U.S. application Ser. No.11/322,560, now U.S. Patent No. 7,269,287, filed Jan. 3, 2006, which claims priority from Japanese patent application 2005-309692, filed Oct. 25, 2005, the contents of which are incorporated herein by reference.

BACKGROUND OF THE INVENTION

The present invention relates to an apparatus (SEM) for radiating a charged particle beam onto a sample of a semiconductor device for example and measuring the dimension of a pattern using a signal waveform reflecting the shape of the pattern, such as, a secondary electron signal or a reflected electron signal generated from the sample, and a method using the same.

As described in Japanese Patent Application Laid-Open No. 55-72807, the pattern dimension management in a semiconductor fabrication process uses an SEM that is an exclusively specified scanning electron microscope for semiconductors. The principle of the SEM is to obtain an electron beam image by focusing an electron beam emitted from an electron gun through a focusing lens, scanning a sample image in two dimensionally by a scanning coil, and capturing a secondary electron generated from the sample as the result of the radiation of the electron beam by means of a detector. Since more secondary electrons are generated at the pattern edge portion, the electron beam image at the pattern edge is bright. Therefore, in the SEM, the dimension is obtained by multiplying the distance between edges on the electron beam image by a pixel size.

Although all kinds of methods for automatically detecting the edge position have been suggested, only two of them will be explained hereafter.

(1) Threshold Method

The concept of the threshold method is provided in Patent Literature 1. As shown in FIG. 1, the parts with large signal corresponding to the left and right side pattern edges are called left white band (left WB) and right white band (right WB), respectively. According to the threshold method, a Max value and a Min value are obtained from the left and right WBs, respectively, a threshold level that divides these by a predetermined ratio is calculated, a position where the signal waveform crosses the threshold is detected as an edge position, and the distance between left and right edges is set to a dimension (CD value).

(2) Function Application

The function application is a method that fits a predetermined function with respect to a signal waveform, and sets a point on the function to an edge position. For example, a method using sigmoid function (Equation 1) is explained in J. S. Villarrubia, A. E. Vladar, T. Postek, "A Simulation Study of Repeatability and Bias in the CD-SEM," Proc. SPIE 5038, pp. 138-149 (2003).

$$y = a + \frac{b-a}{1 + e^{-c(x-x_0)}} \quad (1)$$

Here, a, b, c and $x_0$ are parameters, and a value that fits best with the signal waveform is obtained by the least squares method. Sigmoid function is a transformed S curve of which up and low parts are flat as shown in FIG. 2. Since only the WB fits, it is necessary to set a proper fitting region of the signal waveform in calculation of the parameters through the least squares method. $x_0$ corresponds to a position with a median between the maximum and the minimum, and this $x_0$ is typically set to an edge position. The edge position is detected by WB of the left and right sides, respectively, and the distance therebetween is set to a dimension (CD value).

There is a sample that is easily damaged by the irradiation of an electron beam. The typical example is an ArF exposure photoresist which is widely used in the semiconductor exposure recently, and it tends to shrink by the irradiation of an electron beam. In general, the SEM is required of measurement accuracy and a smaller amount of shrink. To reduce the amount of shrink, it is effective to reduce the electron beam energy amount being irradiated, resultantly requiring dimension measurement using a signal waveform with a very low S/N as shown in FIG. 3(*b*). Moreover, FIG. 3(*a*) illustrates an electron beam image with a high S/N in a case where the electron beam energy amount is high. Because of this, the primary object is how to accomplish high measurement accuracy with a signal waveform having a low S/N. Also, because in a dimension measuring apparatus the accuracy is expressed in terms of reproducibility, the description hereinafter will use the word "reproducibility".

Meanwhile, problems in a case where (1) threshold method and (2) function application are applied to a signal waveform with a low S/N is explained below.

(1) Threshold Method

When the threshold method is applied to the signal waveform with a low S/N as shown in FIG. 3(*b*), it is true that measurement accuracy is not high. Since the reproduction of noise is random, Max value and Min value even for the same sample turned out to be different for every measurement and the threshold level varies. Also, the position where the threshold crosses the signal waveform is deviated by the influence of noise. Deterioration of reproducibility by the results of both sides cannot be solved. Although S/N may be improved by increasing the operator size of smoothing as in FIG. 4, the signal waveform becomes blunt, and therefore the accurate edge result cannot be measured.

(2) Function Application

Compared with the threshold method, the function application is robust against noise. In the threshold method Max value, Min value and the position of a signal waveform crossing the threshold are all influenced by the change in a local signal waveform by noise, whereas in the function application parameters are determined to make a broader region of the signal waveform as shown in FIG. 2 fit overall, so it is difficult to get influenced by the change in a local signal waveform. However, obtaining high reproducibility is limited to a case when the function properly expresses the signal waveform, and in a case where the signal waveform is separated from the function a big error may be caused. In effect, when the inventors conducted experiments for comparing reproducibility of the threshold method with that of the function application based on sigmoid function using diverse samples, it turned out that the reproducibility of the function application was lower than that of the threshold method.

Even though sigmoid function is vertical point symmetry, the signal waveform is not vertical point symmetry. In addition, in case of using the sigmoid function as described above, it is necessary to set a region of the signal waveform to be fitted, and the error in the region set-up may be one of factors that deteriorated the reproducibility. Although the reproducibility may be improved by introducing another function, it is difficult to prepare a function that covers all because the shape of a signal waveform varies over a diverse range.

SUMMARY OF THE INVENTION

Therefore, the present invention relates to an apparatus (SEM) for measuring a dimension at high accuracy even for a sample, e.g., ArF exposure photoresist, which requires the dimension measurement through a signal waveform with a low S/N, and a method using the same.

That is, the present invention relates to an apparatus (SEM) and method for measuring a dimension, in which a partial waveform (or partial image) of a sample signal waveform (or image) acquired from a sample of the same kind with a dimension measurement target sample is templated for a recipe and registered, the signal waveform (or image) of the dimension measurement target sample and the waveform of the sample registration waveform are combined, and a CD value of a dimension measurement target pattern is calculated based on the result of the waveform combination.

Moreover, the present invention relates to a method for measuring a dimension of a dimension measurement target pattern formed on a dimension measurement target sample using the apparatus (SEM) for measuring the dimension, wherein the method is characterized by comprising the steps of: imaging a sample pattern by using the scanning electron microscope based on measurement recipe, and acquiring a sample pattern signal therefrom; forming a one-dimensional or two-dimensional sample signal waveform based on the acquired sample pattern signal; registering a partial waveform of the sample signal waveform as a sample registration waveform; imaging a dimension measurement target pattern formed on a dimension measurement target sample by using the scanning electron microscope based on the measurement recipe, and acquiring a dimension measurement target pattern signal; forming measurement target signal waveforms at a plurality of spots based on the acquired dimension measurement target pattern signal; combining the plural measurement target signal waveforms with the sample registration waveform being registered in the signal waveform registration step; and calculating the amount of edge roughness of the dimension measurement target pattern based on the deviation at the plurality of spots in result of the waveform combination.

The present invention overcomes weakness of the threshold method that is easily influenced by the change in a local waveform and weakness of the function application causing a measurement error when a function that does not well represent a signal waveform of interest is used. Since the dimension measurement of the present invention is obtained by combining signal waveforms, the region of a signal waveform for measurement is large, and therefore it is difficult to get influenced by the change in a local waveform. In addition, since the signal waveform obtained from an actual sample of the same kind with the dimension measurement target is used instead of a function, there is no problem of inadequacy of the waveform. Here, the sample of the same kind means a sample obtained by the same fabrication process. If the semiconductor fabrication process is stable, there is not much difference on the cross-section shape of a sample (wafer) obtained by the same fabrication process, and therefore the signal waveform thereof are usually similar. Thus, the risk is relatively small compared with the function application. These and other objects, features and advantages of the invention will be apparent from the following more particular description of preferred embodiments of the invention, as illustrated in the accompanying drawings.

These and other objects, features and advantages of the invention will be apparent from the following more particular description of preferred embodiments of the invention, as illustrated in the accompanying drawings.

BRIEF DESCRIPTION OF THE DRAWINGS

FIG. 3(a) is a drawing illustrating a signal waveform acquired in a case where a primary electron beam energy being irradiated is large.

FIG. 3(b) is a drawing illustrating a signal waveform acquired in a case where a primary electron beam energy being irradiated is small.

FIG. 11(a) shows a situation where a sample registration waveform for left WB is deviated, and (1)-(5) show situations where the same is deviated by 8 pixels, −4 pixels, 0 pixel, +4 pixels, and +8 pixels, respectively.

FIG. 11(b) is a drawing where a correlation value with a measurement target signal waveform is obtained.

FIG. 14(a) is a flowchart describing an embodiment for measuring the deviation of an edge roughness according to a fourth embodiment of the present invention.

FIG. 14(b) is a drawing illustrating M measurement spots ($w1$-$W_M$) on a line for preparing a signal waveform.

DESCRIPTION OF THE PREFERRED EMBODIMENTS

Figure 5:
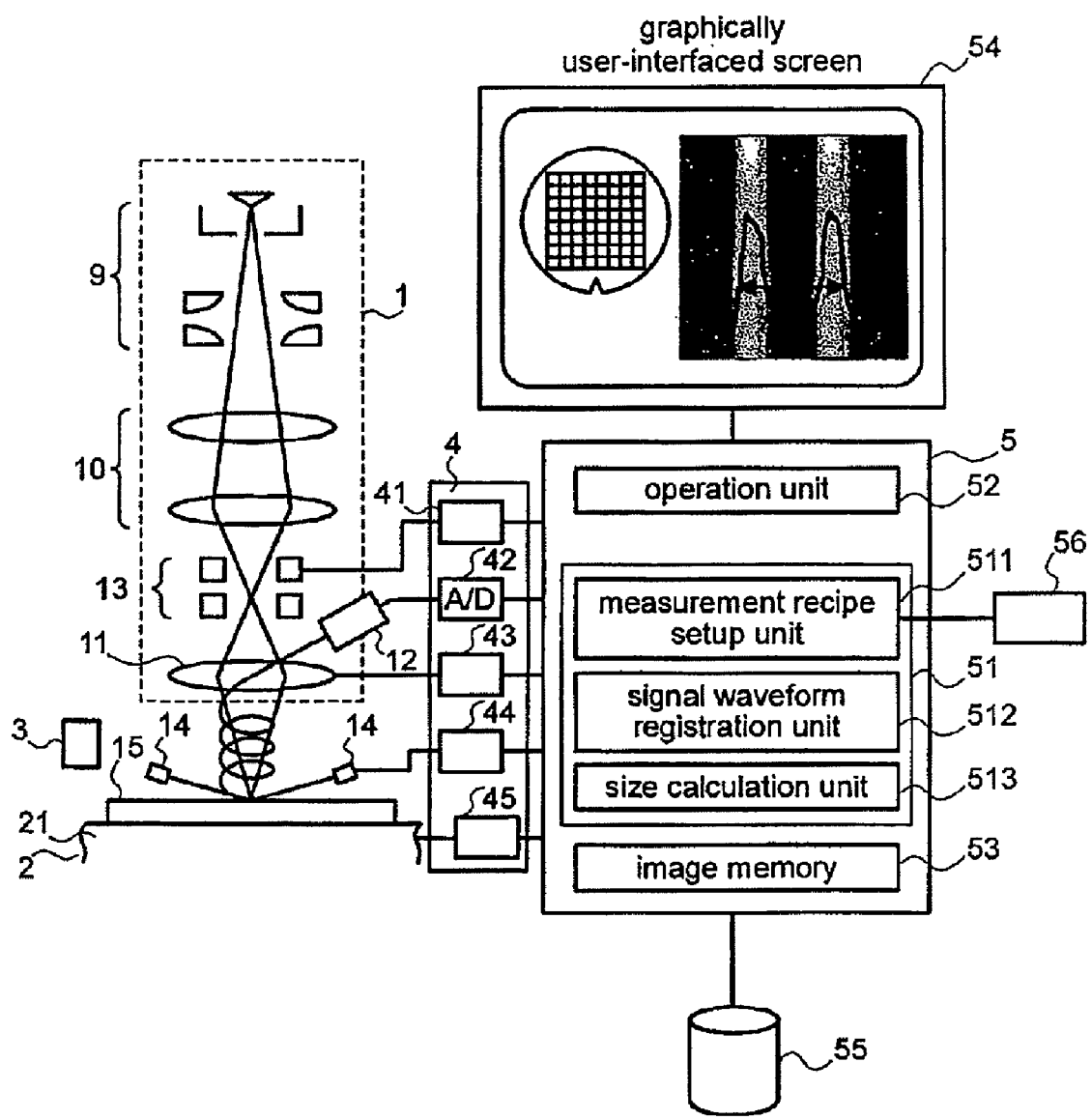
FIG. 5 is a schematic diagram of an apparatus for measuring a dimension according to one embodiment of the present invention.

Although the present invention is applicable to all kinds of charged particle beam devices (SEM, FIB, etc.), an apparatus for measuring a dimension using an electron microscope will be used in the following embodiments. An SEM exclusively specified SEM for semiconductors is used for the pattern dimension management in a semiconductor fabrication process. FIG. 5 illustrates the principle of the SEM according to the present invention. The SEM includes an electro-optical system 1, a stage machinery system 2, a wafer carrier system (not shown), a vacuum exhaust system (not shown), an optical microscope 3, a control system 4, and a signal processing system 5. The electro-optical system 1 includes an electron gun 9, a focusing lens 10, an objective lens 11, a detector 12, a blanking control electrode (not shown), a deflector 13, an EXB (not shown) for forwarding a secondary electron generated from a wafer 15 to the detector 12, and a wafer height detector 14. The stage machinery system 2 includes an XY stage (not shown), a holder 21 for putting the wafer 15, a holder 21, and a retaining power (not shown) for applying a negative(−) voltage to the wafer 15. The control system 4 includes a beam deflection correcting control unit 41, a signal detection system control unit (including an A/D converting unit) 42, a blanking control unit (not shown), an electro-optical system control unit 43, a wafer height sensor detection system 44, and a machinery stage control unit 45.

Figure 6:
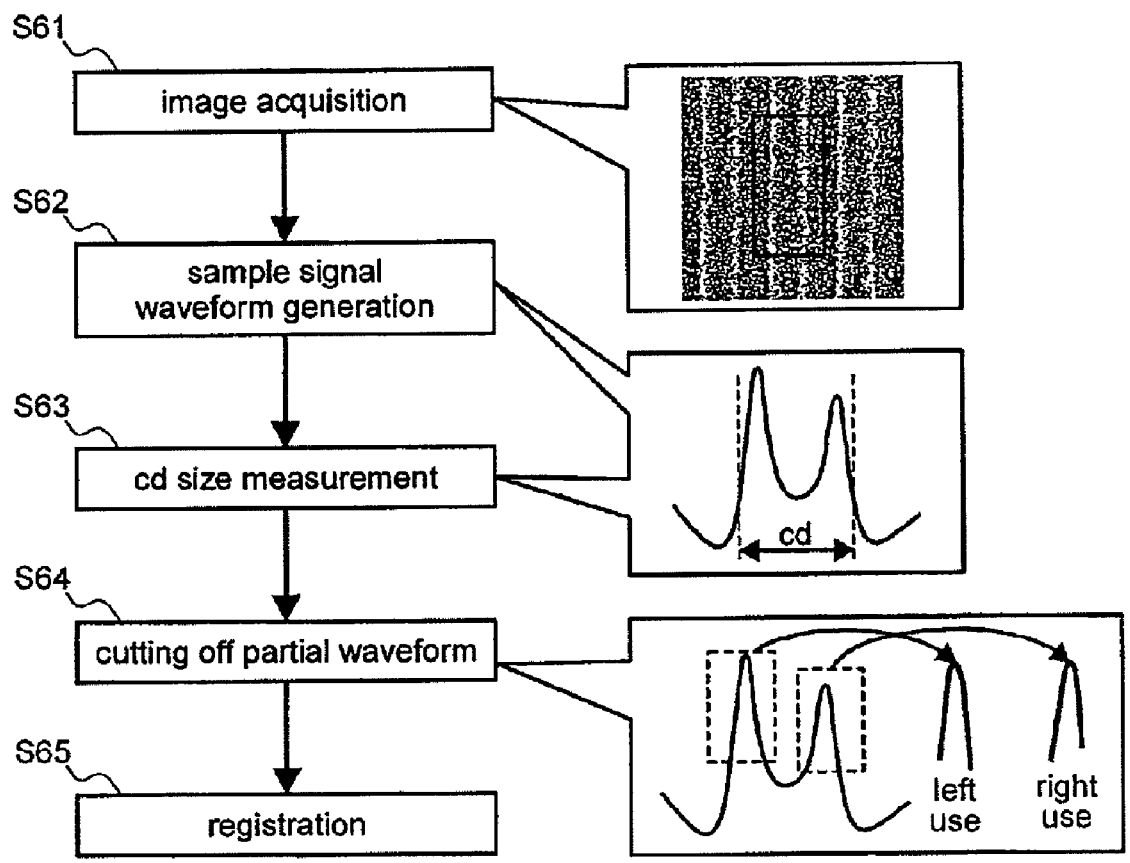
FIG. 6 is a flowchart of dimension measurement according to a first embodiment, in which a sample registration waveform (sample signal waveform) acquired from a sample is registered based on a predetermined measurement recipe (imaging recipe).
Figure 7:
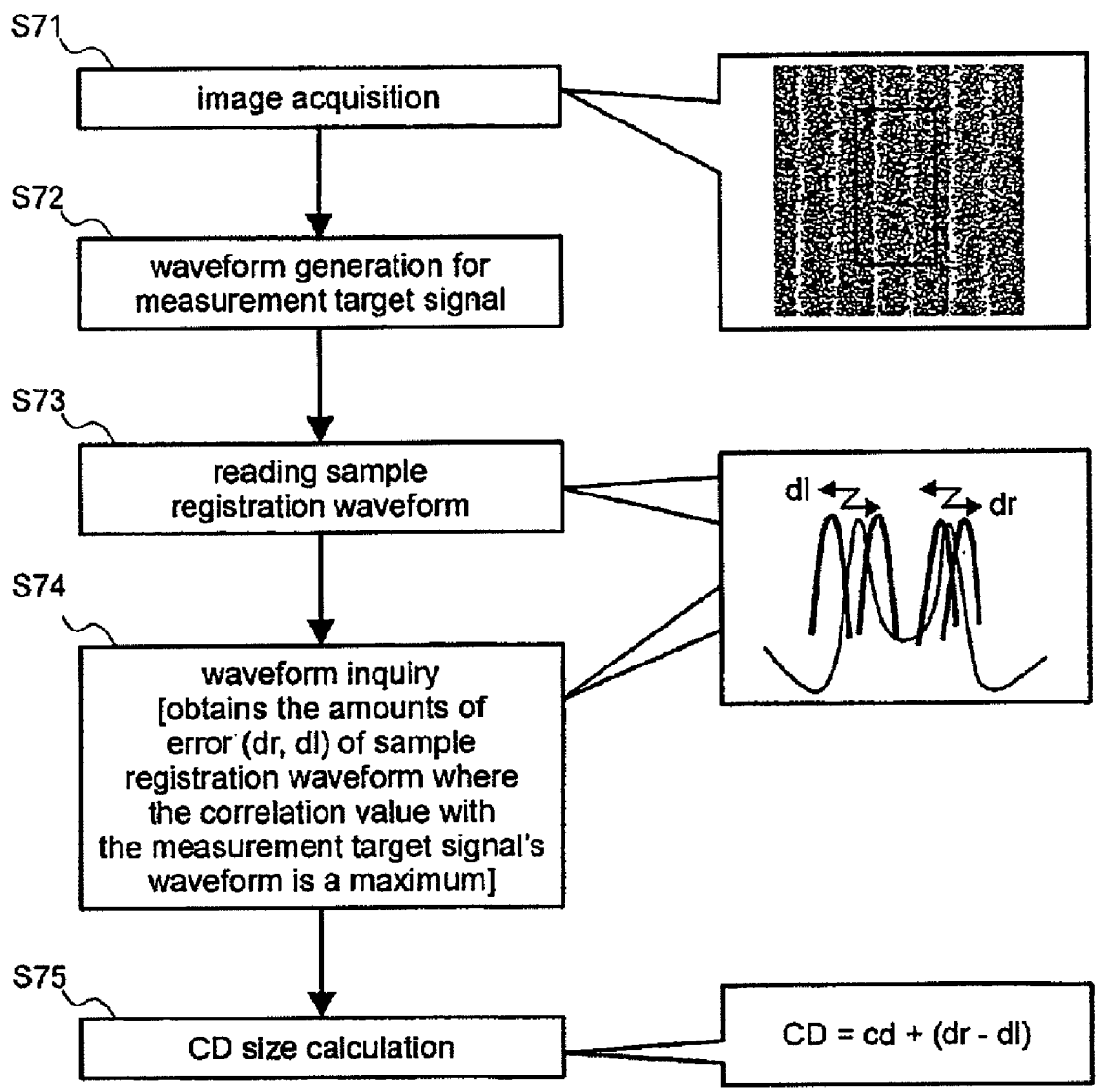
FIG. 7 is a flowchart of dimension measurement according to a first embodiment, in which a dimension of a dimension measurement target pattern is measured by combining a pattern signal acquired from a dimension measurement target sample with a sample registration waveform based on the measurement recipe (imaging recipe).
Figure 8:
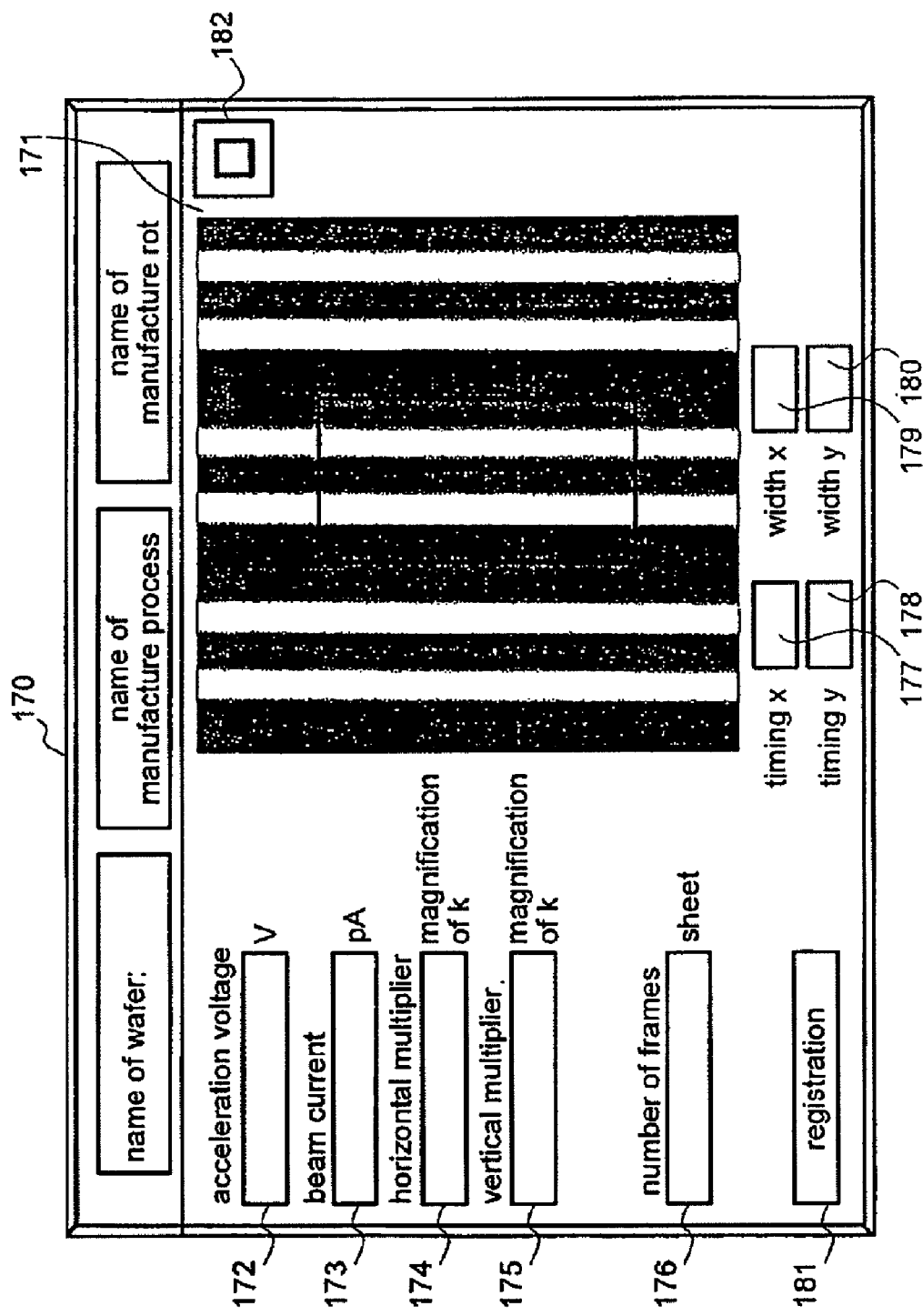
FIG. 8 is a drawing illustrating one embodiment of GUI screen for registering an image based on the measurement recipe (imaging recipe) being set up according to a first embodiment.
Figure 9:
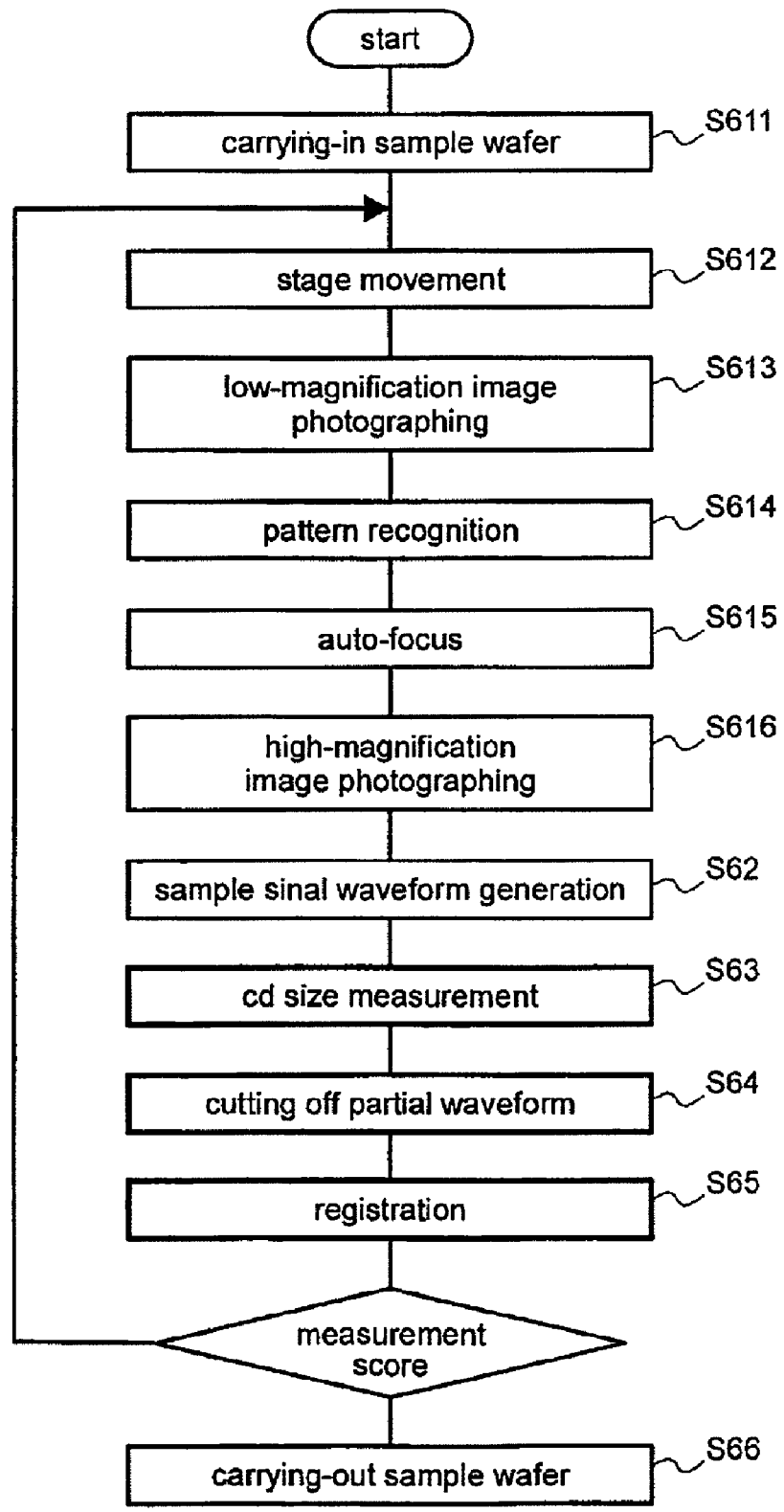
FIG. 9 is a flowchart describing in detail the flow shown in FIG. 6.
Figure 10:
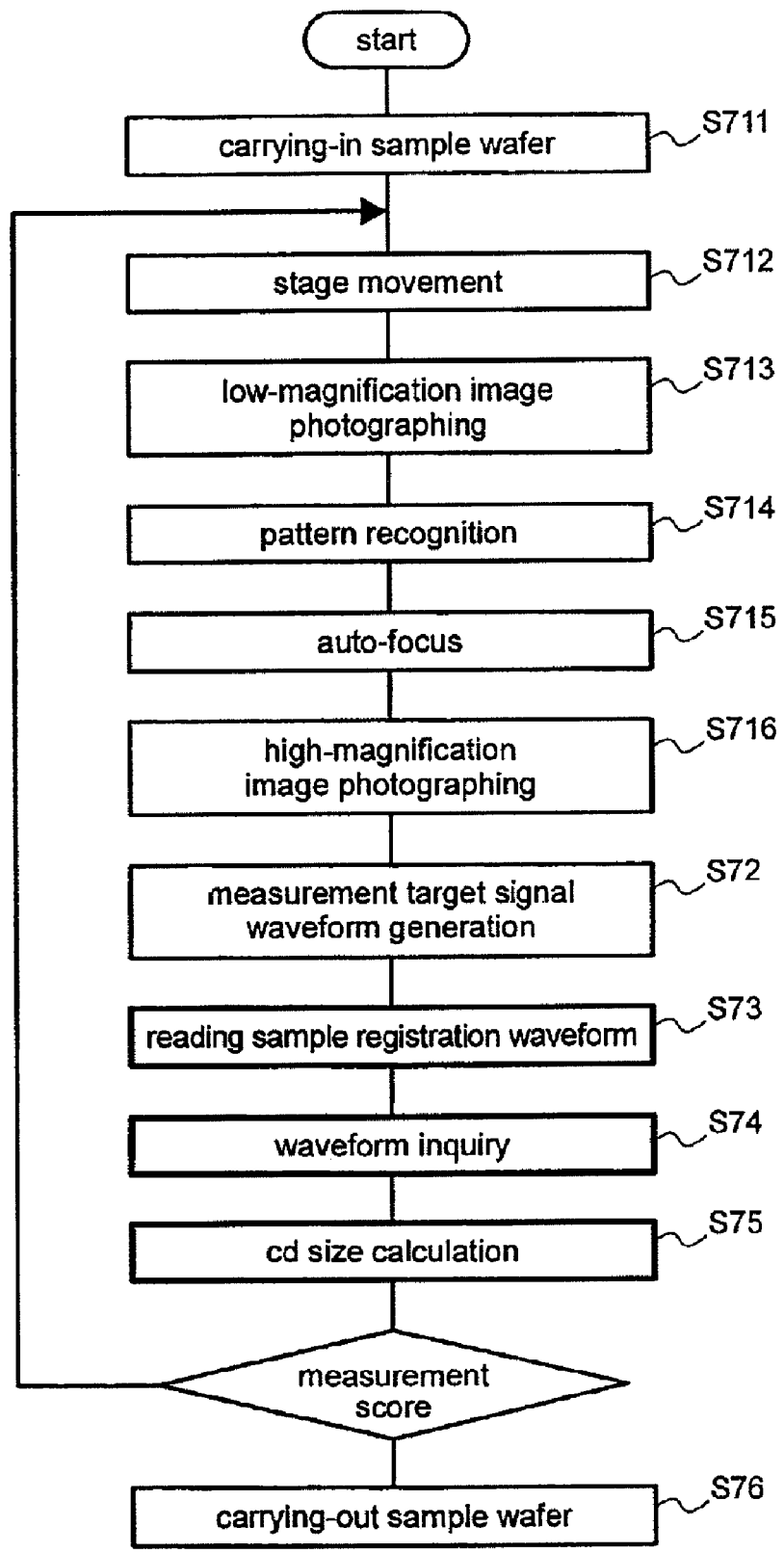
FIG. 10 is a flowchart describing in detail the flow shown in FIG. 7.

The signal detection unit 5 includes a CPU unit 51 having a measurement recipe set-up unit 511 for setting up a measurement recipe (imaging recipe) shown in FIG. 8, a signal waveform registration unit 512 for executing a process flow shown in FIGS. 6 and 9, and a dimension calculation unit 513 for executing a process flow shown in FIGS. 7 and 10, an operating unit 52 for executing input/output operations, an image memory 53 for storing an SEM image acquired from a sample obtained from the same fabrication process with a dimension measurement target sample or an SEM image acquired from a dimension measurement target sample, a display (display device) 54 for displaying GUI (Graphic User Interface) image such as arrangement information of chip and pattern on a wafer, recipe conditions being imaged, and SEM images (more specifically WB (White Band) or prepared signal waveform or combined signal waveform, etc.) for acquisition, and a memory device 55 for memorizing (registering) information on the measurement recipe set by the measurement recipe set-up unit 511, cd value calculated in the signal waveform registration unit 512, cut-off partial signal waveform and CD value of a line width or CD value of a hole dimension calculated by the dimension calculation unit 513 and line edge roughness LER (L), value of R (deviation (standard deviation) at M edge detection spots) or value of roughness LWR (deviation (standard deviation) of M CD values). And, images stored in the image memory 53 or the memory device 55 or all kinds of data are outputted through GUI by the operation of the operating unit 52. In addition, in case of performing a number of measurements using the SEM, it is desirable to prepare an automatic measurement file 56 called a recipe that describes a series of operations for measurement, such as, layout of a wafer according to the kinds of the wafer, coordinates of the measurement spot, measurement conditions, etc.

An electron beam emitted from the electron gun 9 is thinly focused onto the focusing lens 10 and scans an image of the sample 15 into two dimensionally by the deflector (scanning coil) 13. A secondary electron (pattern signal) generated by the sample 15 by the electron beam scanning is captured by the detector 12 and as a result, an electron beam image is acquired. Since more secondary electrons (pattern signals) are generated at the pattern edge portion, the electron beam image corresponding to the pattern edge portion creates a bright image. The magnification of the electron beam image may be randomly changed at the ratio of the scanning width (constant) on the CRT image to the scanning width (variable) of the electron beam on the sample, based on the measurement recipe (imaging recipe). In the SEM, the line pattern dimension S (S=1×p) is obtained by multiplying the line pattern dimension on the electron beam image by the pixel size p.

However, an ArF exposure photoresist which is in main stream of the semiconductor exposure recently tends to shrink by the irradiation of an electron beam. Because of this feature, the SEM (Scanning Electron Microscope) is required of measurement accuracy and a smaller amount of shrink. To reduce the amount of shrink, it is effective to reduce the electron beam energy amount being irradiated, resultantly requiring dimension measurement using a signal waveform with a very low S/N as shown in FIG. 3(b).

Embodiment 1

The process flow of dimension measurement according to a first embodiment using the SEM of the invention will now be explained with reference to FIGS. 6, 7 and 9.

FIG. 6 describes the process flow using the measurement recipe set-up unit 511 and the signal waveform registration unit 512 of the CPU 51 shown in FIG. 5, and the operating unit 52, the display 54 and the image memory 53, in which at least one sample (sample wafer) is extracted (picked up) from a sample group (wafer group) fabricated by the same fabrication process (preferably the same fabrication lot unit) with the dimension measurement target sample that requires dimension measurement using a signal waveform with a very low S/N, and a signal waveform acquired from the extracted sample is registered.

To begin with, it is necessary to set up the measurement recipe (imaging recipe) in the SEM in order to extract at least one sample from the sample group fabricated by the same fabrication process (preferably the same fabrication lot unit) with the dimension measurement target sample, and register the signal waveform acquired from the extracted sample (designated to wafer name, fabrication process name, fabrication lot name, etc.). In the measurement recipe set-up unit 511, as shown in GUI screen 170 of FIG. 8, an accelerating voltage (V) 172, beam current (pA) 173, horizontal magnification (k multiplication) 175, and frame addend (sheet) 176 can be considered for the measurement recipe that is set up by using the operating unit 52. Besides, layout information of wafer according to the kind of wafer (including the kind of wafer in a different fabrication process) and the coordinate information of the measurement spot are also included in the measurement recipe.

Moreover, in the measurement recipe set-up unit 511, information about the extracted sample (wafer name, fabrication process name, fabrication lot name, etc.) is designated using the operating unit 52. In result, among the sample group fabricated by the same fabrication process with the dimension measurement target, an image 171 is imaged with the accelerating voltage, beam current, horizontal magnification, vertical magnification and frame addend that are set for a designated sample to acquire an SEM image, and the acquired SEM image is stored in the image memory 53 (S61). These imaging conditions (imaging recipe) are preferably same as the imaging conditions for imaging a sample where the dimension measurement target pattern in step S71 of FIG. 7 is formed.

Next, as shown in FIG. 8, a signal waveform write region (attention area expressed by a rectangle frame) is designated dragging a cursor on the image 171 in rectangular shaped cursor mode in 182. Here, numerals of x point 177, y point 178, x width 179, and y width 180 are varied interworking with the drag. Instead of designating the region using the cursor, it is possible to input numerals 177, 178, 179, and 180 for example. And, by clicking in 181, the image in the signal waveform write region is registered to the image memory 53 or the internal memory of the CPU 51. At this time, the coordinates of the signal waveform write region on the image 171 are transformed to the coordinates on a sample wafer based on the reference mark formed on the sample wafer. Therefore, the dimension measurement target sample is also positioned equally for the SEM.

Figure 1:
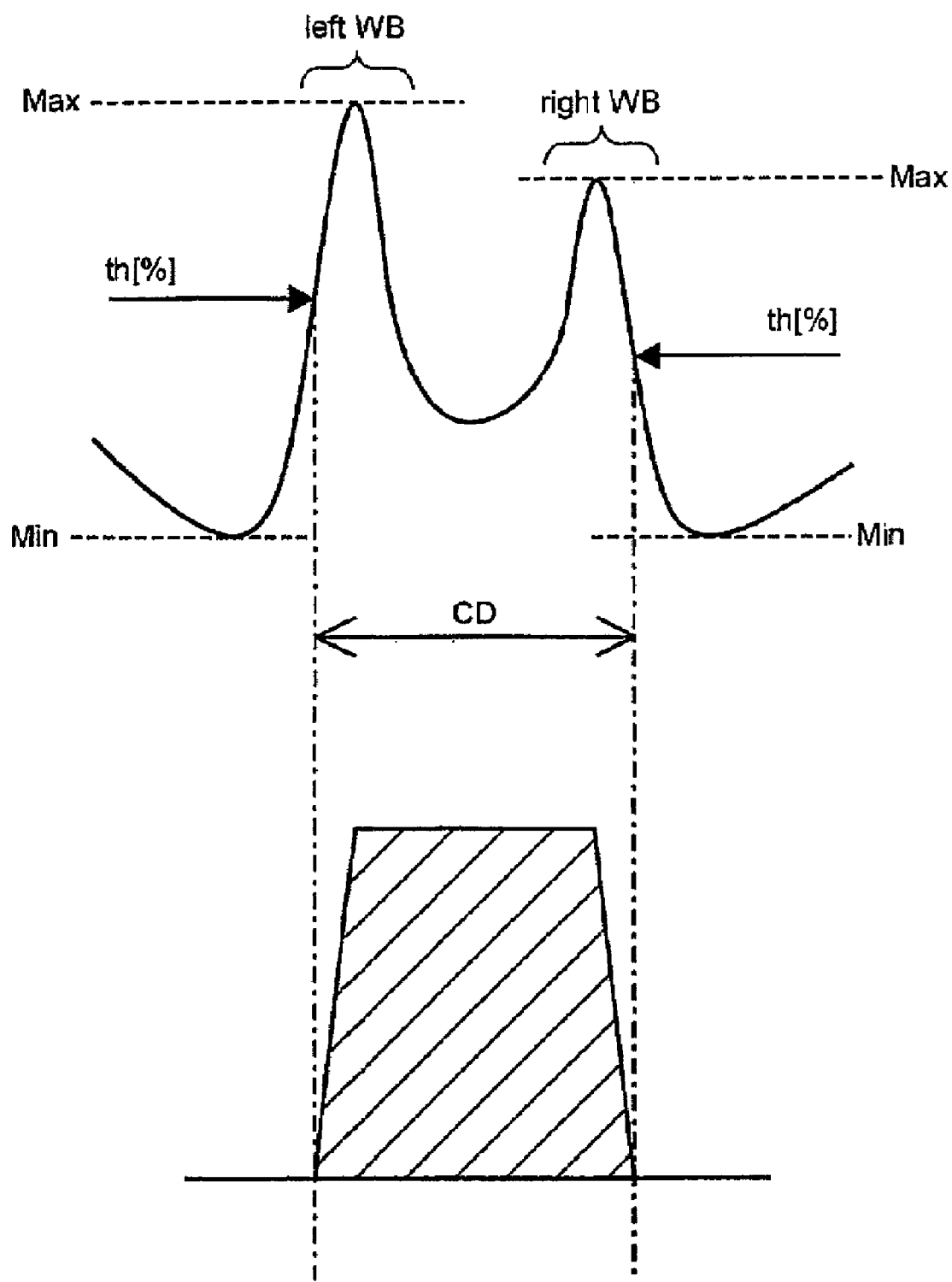
FIG. 1 is a drawing for explaining a threshold method that is a related art dimension measurement method.
Figure 2:
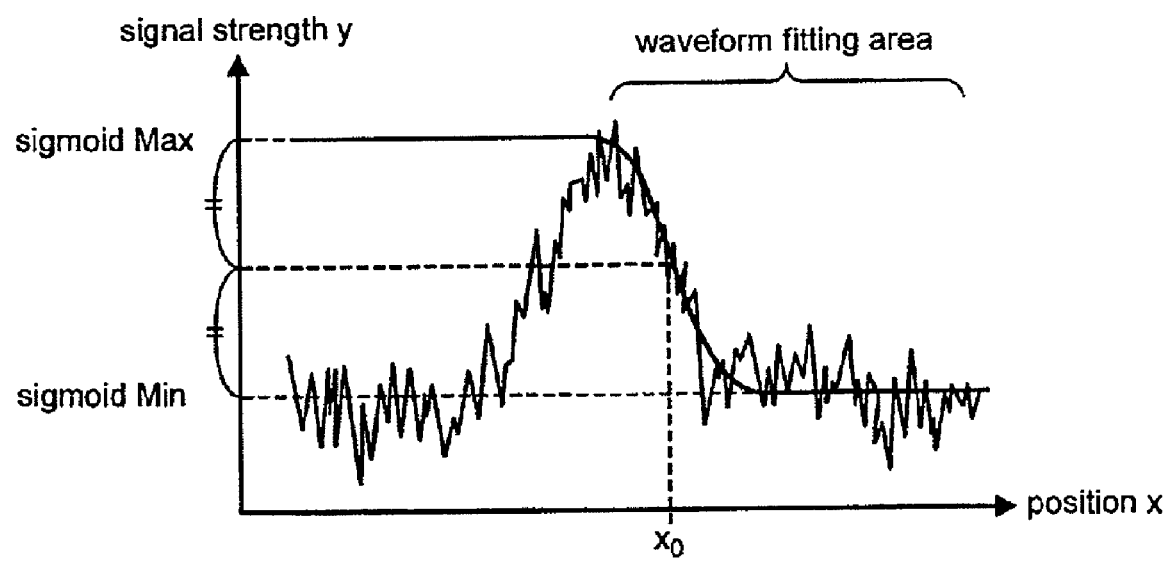
FIG. 2 is a drawing for explaining a function application that is a related art dimension measurement method.
Figure 4:
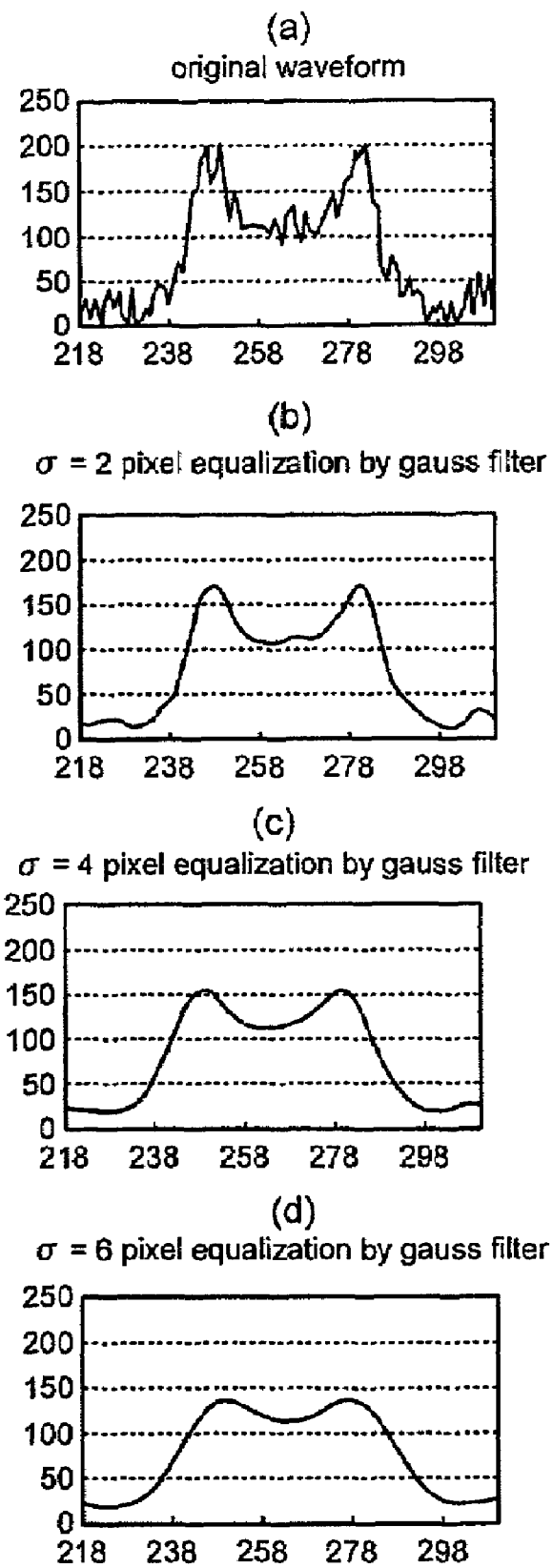
FIG. 4(a) is a drawing illustrating an original waveform of a detected signal that is acquired by irradiating and scanning an electron beam focused onto a pattern.
FIG. 4(b) is a signal waveform diagram obtained by smoothing the waveform of a detected signal by the Gauss filter of $\sigma=2$ pixel.
FIG. 4(c) is a signal waveform diagram obtained by smoothing the waveform of a detected signal by the Gauss filter of $\sigma=4$ pixel.
FIG. 4(d) is a signal waveform diagram obtained by smoothing the waveform of a detected signal by the Gauss filter of $\sigma=6$ pixel.

Next, the signal waveform registration unit 512 writes a sample signal waveform by performing line addition (addition of the signal waveform of each line in y direction) and smoothing on the attention region (signal waveform write region) expressed by the rectangle frame in FIG. 6 (S62), measures 'cd', the line pattern width, by the threshold method shown in FIG. 1 for example from the sample signal waveform (S63), and registers this value together with the information on the sample and the information on the set measurement recipe in the memory device 55 for example. According to the threshold method, Max value and Min value of the gradation value (brightness value) for example are obtained from the left and right WB, respectively, a threshold level dividing these by a predetermined ratio is calculated, the position where the signal waveform crosses the threshold is detected as an edge position, and the distance between the left and right edges is set to the line pattern width dimension (cd value) Further, the signal waveform registration unit 512 lays open the spot corresponding the left side WB and the right side WB from the signal waveform (S64), and registers it additionally to the memory device 55 (S65). Determination of the start point and end point of laying open the waveform may be done automatically by giving the threshold, or manually designate coordinates by displaying the signal waveform on the GUI screen 54 (170) and operating the operating unit 52.

In this manner, before measuring a dimension of the dimension measurement target pattern, the coordinate information of the attention region (signal waveform write region) expressed by the rectangle frame, cd value being measured, and partial waveform of the left and right side, that are obtained based on the SEM image acquired by imaging the pattern of the sample (sample wafer) fabricated by the same fabrication process with the sample (wafer) where the dimension measurement target pattern is formed under the measurement recipe conditions, are registered together with the information about the sample and the information about the measurement recipe in the memory device 55 for example.

To elaborate the image acquisition step S61 referring to FIG. 9, the sample wafer is taken in the SEM (S611), the stage is moved to close to the dimension measurement spot (S612), the image is imaged at a low magnification, about 10000 times (S613), an accurate position of the dimension measurement spot is obtained by pattern recognition templating the registered image (S614), focusing (S615) is performed using a proper pattern around the dimension measurement spot, an image of high magnification about 150000 times for dimension measurement is imaged by limiting the scanning range of the primary electron beam to even narrow range (S616), the image 171 for the designated sample wafer is taken by applying the accelerating voltage, beam current, horizontal magnification, vertical magnification and frame addend to obtain the SEM image, and thusly acquired image is stored in the image memory 53. Also, the steps S61 (S612-S616)-S65 are repeated on the sample wafer by measurement point, and taken out from the SEM (S66).

Next, the flow for measuring a dimension of the dimension measurement target pattern of the dimension measurement target sample in the dimension calculation unit 513 is explained with reference to FIG. 7. First of all, using the SEM shown in FIG. 5 the SEM image of the dimension measurement target pattern is acquired under the same imaging conditions (imaging recipe) with the sample (S71). Then, the dimension calculation unit 513, similar to the step S62 in FIG. 6, performs line addition (addition of the signal waveform of each line in y direction) and smoothing on the attention region (signal waveform write region) expressed by the rectangle frame to write the measurement target signal waveform (S72).

Further, the dimension calculation unit 513 first reads (S73) the sample registration waveform (left side partial waveform and right side partial waveform) that is registered to the memory device 55, and performs the waveform combination (S74). The waveform combination is performed on the left and right WBs, respectively. In detail, it deviates the sample registration waveform by 1 pixel, obtains the correlation value with the measurement target signal waveform written in step S72, and obtains the deviation amount where the correlation value is maximum. Suppose that the deviation amount on the left side WB is dl, and the deviation amount on the right side WB is dr. Then, the CD of the dimension measurement target pattern can be expressed as follows (Equation 2) (S75).

Although the partial waveform of the sample signal waveform was registered as the sample registration waveform, the SEM image itself acquired in step S61 of FIG. 6 can be stored in the memory device 55, the SEM image of the dimension measurement target pattern is read instead of performing step S73, and the steps S62-S64 are executed before proceeding to the step S74.

$$CD=cd+(dr-dl) \quad\quad\quad\quad\quad\quad \text{(Equation 2)}$$

Here, cd is the line pattern width measured by the threshold method for example, based on the SEM image acquired by imaging the line pattern formed on the sample wafer.

Similar to FIG. 9, to elaborate the image acquisition step S71 referring to FIG. 10, the sample wafer is taken in the SEM (S711), the stage is moved to close to the dimension measurement spot (S712), the image is imaged at a low magnification, about 10000 times (S713), an accurate position of the dimension measurement spot is obtained by pattern recognition templating the registered image (S714), focusing (S715) is performed using a proper pattern around the dimension measurement spot, an image of high magnification about 150000 times for dimension measurement is imaged by limiting the scanning range of the primary electron beam to even narrow range (S716), the image for the dimension measurement target wafer is taken by applying the accelerating voltage, beam current, horizontal magnification, vertical magnification and frame addend to obtain the SEM image, and thusly acquired image is stored in the image memory 53. Also, the steps S71 (S712-S716) S75 are repeated on the sample wafer by measurement point, and taken out from the SEM (S76).

To perform dimension measurement using the signal waveform with a very low S/N as shown in FIG. 3(b), a sample registration waveform (or image) is required. Because of this, in the step S73 the sample registration waveforms (left side partial waveform and right side partial waveform) are read, respectively, and dimensions thereof are measured in the steps S74 and S75. As explained above, the present invention is characterized by including the step S73 for reading the sample registration waveform (or image) acquired from the sample wafer based on the same fabrication process.

FIG. 11 explains in detail the method for waveform combination in the step S74. FIG. 11(a) (1)-(5) illustrate situations where the left side WB sample registration waveform is deviated by 8 pixels, −4 pixels, 0 pixel, +4 pixels, and +8 pixels, respectively. Here, the value of 1 pixel being deviated is about 1-3 nm. The result of the correlation value with the measurement target signal waveform is shown in FIG. 11(b). In this embodiment, the correlation value is maximized at the deviation amount 0 pixel. In this case, the real value x of the deviation amount where the real correlation value is maximized ranges between −1<x<1. To obtain the deviation amount where the correlation value is maximized at the accuracy below the pixel, a parabola is applied to the correlation values at the deviation amount −1 pixel, 0 pixel and +1 pixel, respectively, and the peak positions thereof are calculated.

So far, the first embodiment of the present invention has been explained. According to the first embodiment, the reproducibility of the line pattern measurement is improved. Using the similar method, it is also possible to measure the pitch of plural line patterns. According to the experiments done by the inventors, about 30% of reproducibility was improved by the threshold method.

Embodiment 2

In the second embodiment, unlike the first embodiment where the sample registration waveform (signal waveform) obtained from the sample based on the same fabrication process with the dimension measurement target sample is used for the combination with the dimension measurement target, the signal waveform registration unit 512 or the dimension calculation unit 513 in this embodiment performs the waveform transformation on the sample registration waveform obtained from the sample by calculating an approximate waveform through the function application or the filtering process to increase the accuracy of the combination.

The waveform obtained from the sample based on the same fabrication process with the dimension measurement can be the sample registration waveform (signal waveform), although not the completely identical signal waveform, and the waveform can be changed somewhat by the focus error during the imaging process. Even in this situation, according to the second embodiment, the waveform transformation is executed on the sample registration waveform, so it becomes possible to secure the reproducibility even through the S/N of the measurement target signal waveform being imaged by the SEM is very low.

Figure 12:
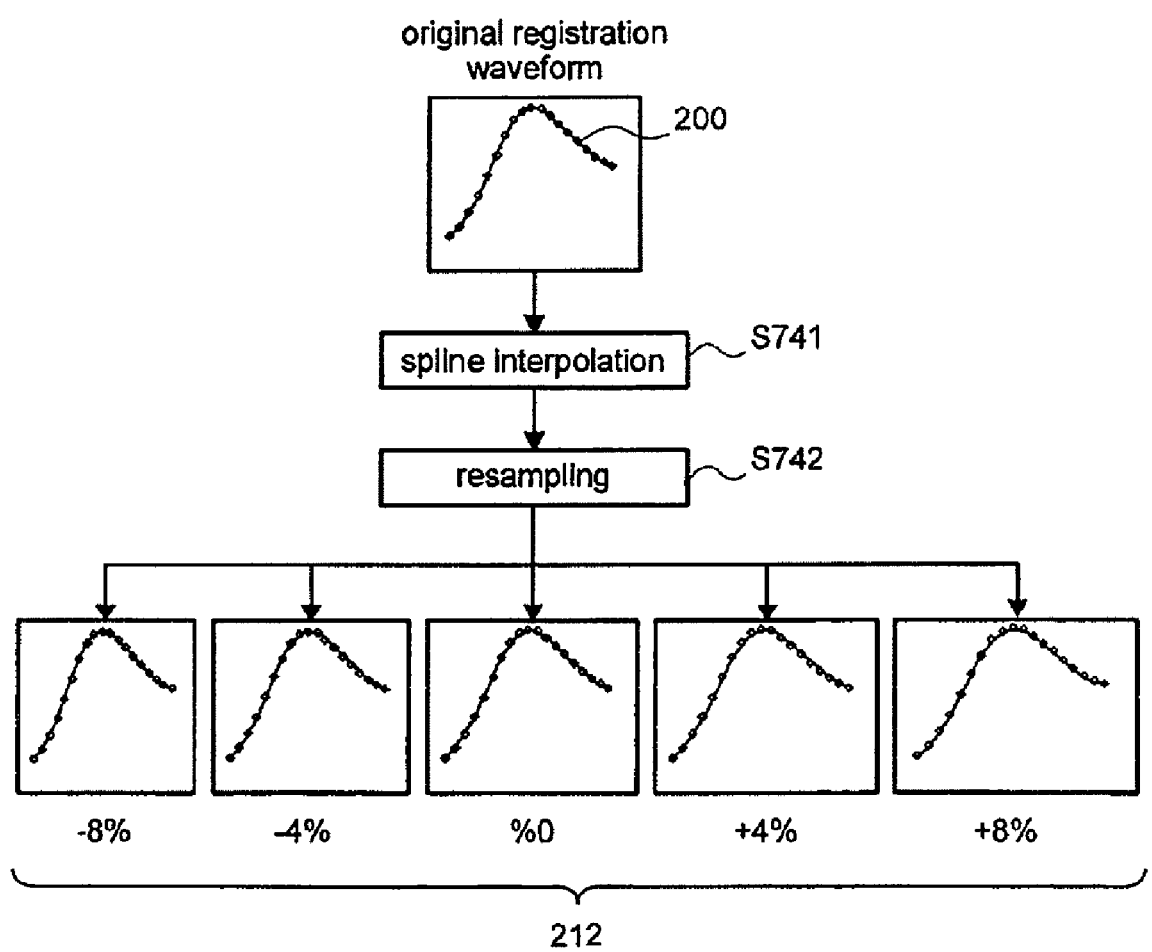
FIG. 12 is a drawing for explaining one embodiment of waveform transformation of a sample registration waveform according to a second embodiment of the present invention.

FIG. 12 illustrates one embodiment of the waveform transformation method according to the second embodiment. For instance, the dimension calculation unit 513 executes one of the function application on the original sample registration waveform (signal waveform) 200 that is discrete data of the pixel pitch being read, and obtains a spline function connecting data smoothly (S741). In case of using the three-dimensional spline function, the value between data is expressed continuously in three dimensions. Therefore, by calculating an approximate waveform whose values between data are continuously expressed in three dimensions, it becomes possible to apply the approximate waveform to the waveform combination with the measurement target signal waveform.

Moreover, when resampling is done by changing the sampling pitch (S742), the sample registration waveform (signal waveform) is either scaled down or magnified. Even though in FIG. 12 the pitches are set to −8%-+8%, and 4% (212), in practice, a plurality of waveforms are written and registered in even narrow pitch (e.g., 1% pitch), and in the step S74 for the waveform combination the entire waveforms are combined to utilize the deviation amount (dr, d1) in a case where the correlation value is maximized. That is to say, the approximate waveform calculated by the function application through the coordinate transformation is scaled down or magnified to get a plurality of reduced or magnified waveforms, which are then combined with the measurement target signal waveform, and the CD value of the dimension measurement target pattern or edge roughness amount (to be described) is obtained based on the best combination result among the plural combinations (the deviation amount (dr, dl) where the correlation value is maximized).

As for the waveform transformation, Gauss filter, another form of filtering process, giving σ value to the sample registration waveform (signal waveform) may be utilized. Therefore, an approximate waveform is calculated by performing the filtering process on the sampling registration waveform, and thusly calculated approximate waveform is used for the waveform combination with the measurement target signal waveform. Moreover, a plurality of approximate waveforms are calculated by changing the filter size of the sample registration waveform and performing the filtering process thereon. Thusly calculated approximate waveforms are combined with the measurement target signal waveform, and the CD value of the dimension measurement target pattern or edge roughness amount (to be described) is obtained based on the best combination result among the plural combinations.

Embodiment 3

Figure 13:
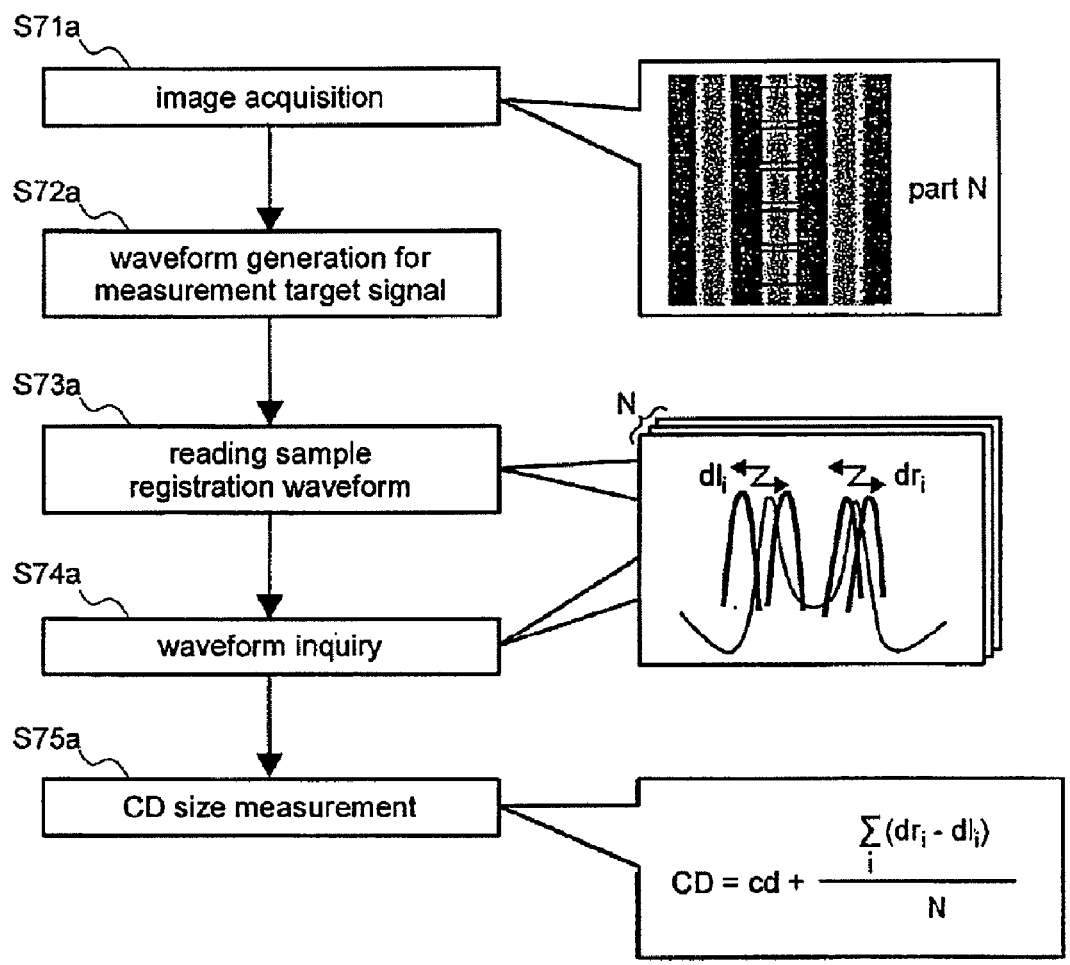
FIG. 13 is a flowchart describing a multipoint dimension measurement according to a third embodiment of the present invention.

In the third embodiment, line measurement is performed on a plurality of spots on the line, i.e., multipoint measurement. The flow for registering the sample registration waveform shown in FIG. 6 is identical with that of the first embodiment. In the multipoint measurement, the flow corresponding to FIG. 7 is described in FIG. 13. To begin with, an SEM image is acquired (S71a) and stored in the image memory 53. Next, the dimension calculation unit 513 writes a measurement target signal waveform at N spots on the line (S72a), reads the sample registration waveform from the memory device 55 for example (S73), performs the combination with the left side partial waveform and the right side partial waveform deviated by a pixel unit or below the pixel unit in the respective N measurement target signal waveforms, and obtains the deviation amount dli, dri (I=1−N) where the correlation value at N spots is maximized (S74a). And, the dimension calculation unit 513 obtains the line width CD with the average of N sports as expressed in Equation 3 (S75a).

$$CD = cd + (_{i=1-N}\Sigma(dri-dli)/N) \quad \text{(Equation 3)}$$

As explained above, according to the third embodiment, since the line width CD is calculated with the average of multipoint (N spots), it becomes possible to improve the reproducibility even more.

Embodiment 4

In the fourth embodiment, the present invention is applied to the measurement of line edge roughness. The flow for registering the registration waveform (signal waveform) shown in FIG. 6 is identical with that of the first embodiment. As for the measurement of line edge roughness, the flow corresponding to FIG. 7 is described in FIG. 14(*a*). At first, an image is acquired (S71*b*) and stored in the image memory 53. Later, the dimension calculation unit 513, as shown in FIG. 14(*b*), writes a signal waveform at M measurement spots ($w_1$–$w_M$) on the line (S72*b*). In order to measure the roughness of a shorter period, it is necessary to reduce the individual line addend by 5 lines, and reduce the deviating pitch in the line direction of each measurement spot (about 1 line according to a shorter period of the edge roughness). For example, the line addend is set to 1-5 lines, and the pitch (the pitch in the line direction of neighboring measurement spots) in the line direction of each measurement spot is set to 1 line (1-3 nm).

Next, the dimension calculation unit 513 reads the sample registration waveform from the memory device 55 (S73), combines M signal waveforms with the sample registration waveform, and obtains the deviation amount dli, dri (i=1–M) where the correlation value is maximized (S74*b*). Moreover, the dimension calculation unit 513 obtains standard deviations, stdev ($dl_1, dl_2, \ldots, dl_M$) and stdev ($dr_1, dr_2, \ldots, dr_M$), for each of the LER (L) and (R) of the line edge roughness which indicates the deviation at the M edge detection spots as shown in the step S75*b*. Furthermore, the dimension calculation unit 513 obtains the standard deviation, stdev ($CD_1, CD_2, \ldots, CD_M$), which indicates the deviation of M CD values for the line width roughness LWR, as shown in step S75*b*. Here, $CD_i$ can be expressed as follows (Equation 4). As for the index indicating the line edge roughness LER(L), (R) and the deviation of the line width roughness LWR, the difference between the Max value and the Min value can be used instead of the standard deviation.

$$CD_i = cd_i + (dr_i - dl_i) \quad \text{(Equation 4)}$$

As explained before, the dimension calculation unit 513 combines the sample registration waveform with the signal waveform of each of M measurement target signal waveforms whose line addend in the line direction at each measurement spot or the pitch in the line direction between measurement spots, obtains the deviation amount dli, dri (i=1–M) where the correlation value is maximized, obtains standard deviations, stdev ($dl_1, dl_2, \ldots, dl_M$) and stdev ($dr_1, dr_2, \ldots, dr_M$), for each of the LER (L) and (R) of the line edge roughness which indicates the deviation at the M edge detection spots, and obtains standard deviation, stdev ($CD_1, CD_2, \ldots, CD_M$), which indicates the deviation of M CD values for the line width roughness LWR. In this way, the reproducibility can be improved. Here, the edge roughness amount being calculated is displayed through the display means 54 and 170.

Embodiment 5

Figure 15:
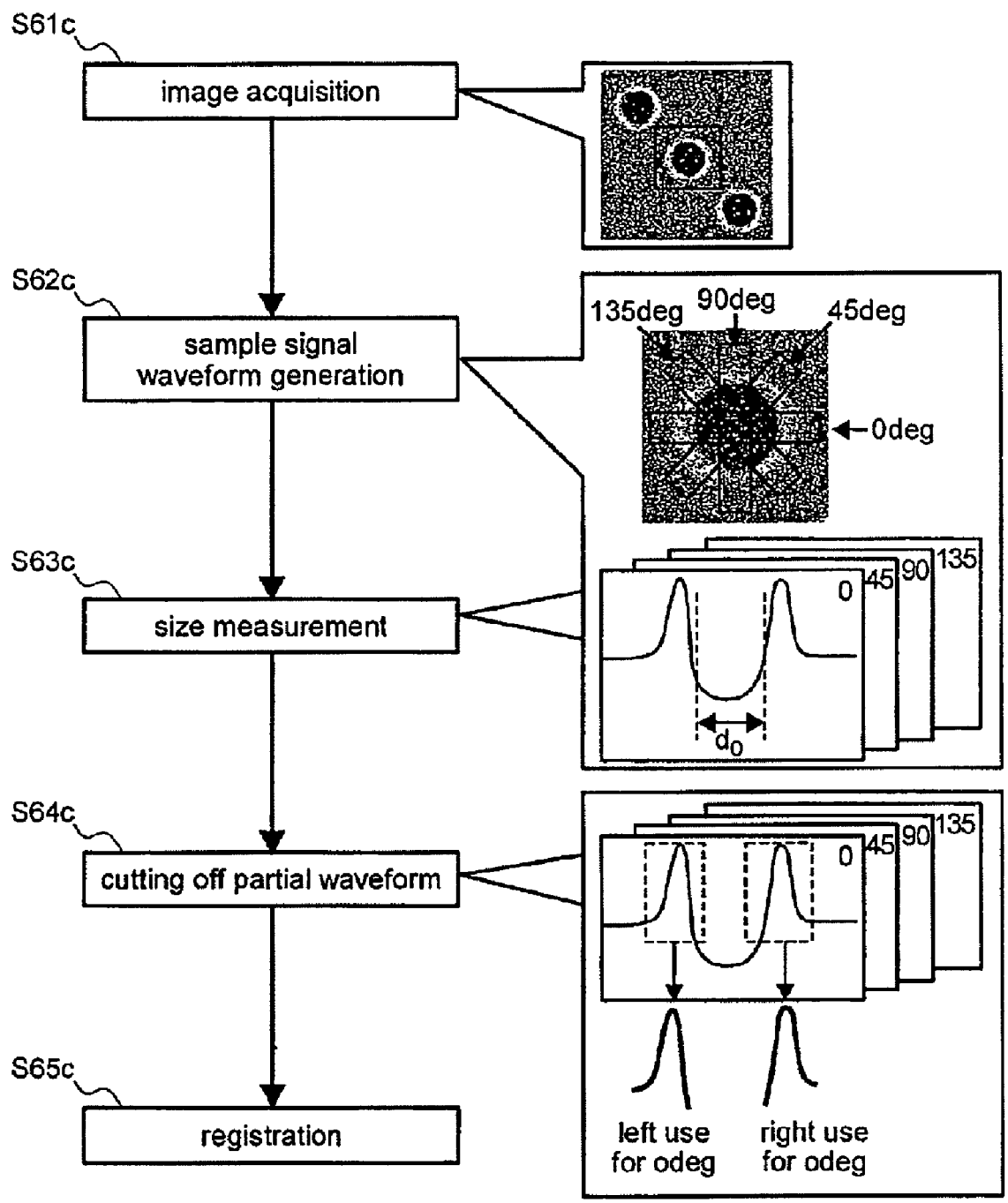
FIG. 15 is a flowchart describing an embodiment for registering a sample registration waveform in advance in a hole pattern dimension measurement according to a fifth embodiment of the present invention.

In the fifth embodiment, the present invention is applied to the hole pattern dimension measurement. FIG. 15 is a flowchart describing the procedure of registration of the signal waveform obtained from a sample fabricated by the same fabrication process with the dimension measurement target sample. The SEM shown in FIG. 5 obtains an SEM image of the sample (wafer) fabricated by the sample fabrication process with the dimension measurement target sample (S61*c*), and stores the image in the image memory 53. And, the signal waveform registration unit 512 performs line addition or smoothing on the attention hole surrounded by the rectangle frame on the drawing in four directions, e.g., 0 degree direction, 45-degree direction, 90-degree direction and 135-degree direction, to write a sample signal waveform (S62*c*). The signal waveform registration unit 512 measures from the sample signal waveform the hole dimension $d_i$ (i=0, 45, 90, 135) by utilizing the threshold method shown in FIG. 1 (S63*c*), and registers it to the memory device 55 for example, together with the information about the sample and the information about the set measurement recipe. Using the threshold method, Max value and Min value of the gradation value (brightness value) for example for each of the 0-135 WB, the threshold level dividing them by a predetermined ratio is obtained, the position where the threshold crosses the signal waveform is detected as the edge position, and the distance between edges of 0-135 is set to the hole dimension ($d_i$ (i=0, 45, 90, 135)).

Later, the signal waveform registration unit 512 lays open the spot corresponding the left side WB and the right side WB from the sample signal waveform (S64*c*), and registers it to the memory device 55 for example (S65). Determination of the start point and end point of laying open the waveform may be done automatically by giving the threshold, or manually by designating coordinates.

Although four directions, i.e., 0-degree direction, 45-degree direction, 90-degree direction and 135-degree direction, are used in this embodiment, the number of directions can be increased or decreased according to the purpose of measurement.

Figure 16:
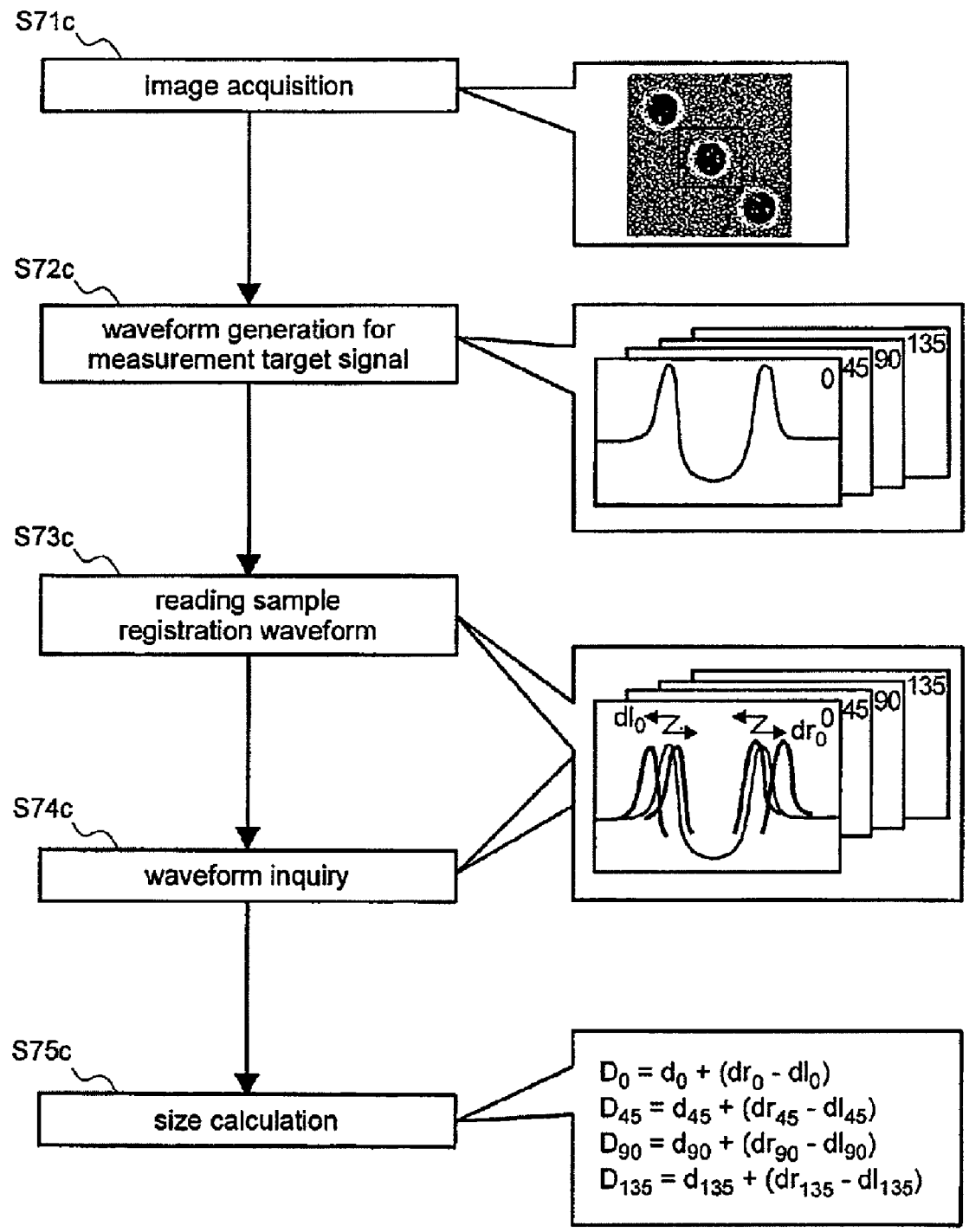
FIG. 16 is a flowchart describing an embodiment for dimension measurement in a hole pattern dimension measurement according to a fifth embodiment of the present invention.

FIG. 16 is a flowchart explaining the procedure of measuring the hole dimension of the dimension measurement target of the dimension measurement target sample. The SEM shown in FIG. 6 acquires an SEM image of the dimension measurement target sample (S71*c*), and stores it in the image memory 53. And, the dimension calculation unit 513 writes a signal waveform thereof, similarly to the step S62*c* (S72*c*). Later, the dimension calculation unit 513 reads the previously stored sample registration waveform from the memory device 55 (S73*c*), and combines the read sample registration waveform with the measurement target signal waveform (S74*c*). Here, the waveform combination is performed on the left and right side WBs, respectively. In detail, the dimension calculation unit 513 deviates the sample registration waveform by 1 pixel pitch, obtains the correlation value with the measurement target waveform written in the step S72*c*, and obtains the deviation amount where the correlation value is maximized. Suppose that the deviation amount at the left side WB is $dl_i$ (i=0, 45, 90, 135) and the deviation amount $dr_i$ (i=0, 45, 90, 135). Then, the hole dimension of the measurement target, $D_i$ (i=0, 45, 90, 135) can be obtained as follows (Equation 5) (S75*c*).

$$D_i(i=0,45,90,135) = d_i + (dr_i - dl_i)(i=0,45,90,135) \quad \text{(Equation 5)}$$

Although only one hole dimension was measured in this embodiment, a plurality of home dimensions may be measured and averaged. Therefore, according to the fifth embodiment, even though the measurement target signal waveform being imaged by the SEM has a very low S/N, the reproducibility of the hole pattern dimension is good and can be easily measured.

Embodiment 6

Figure 17:
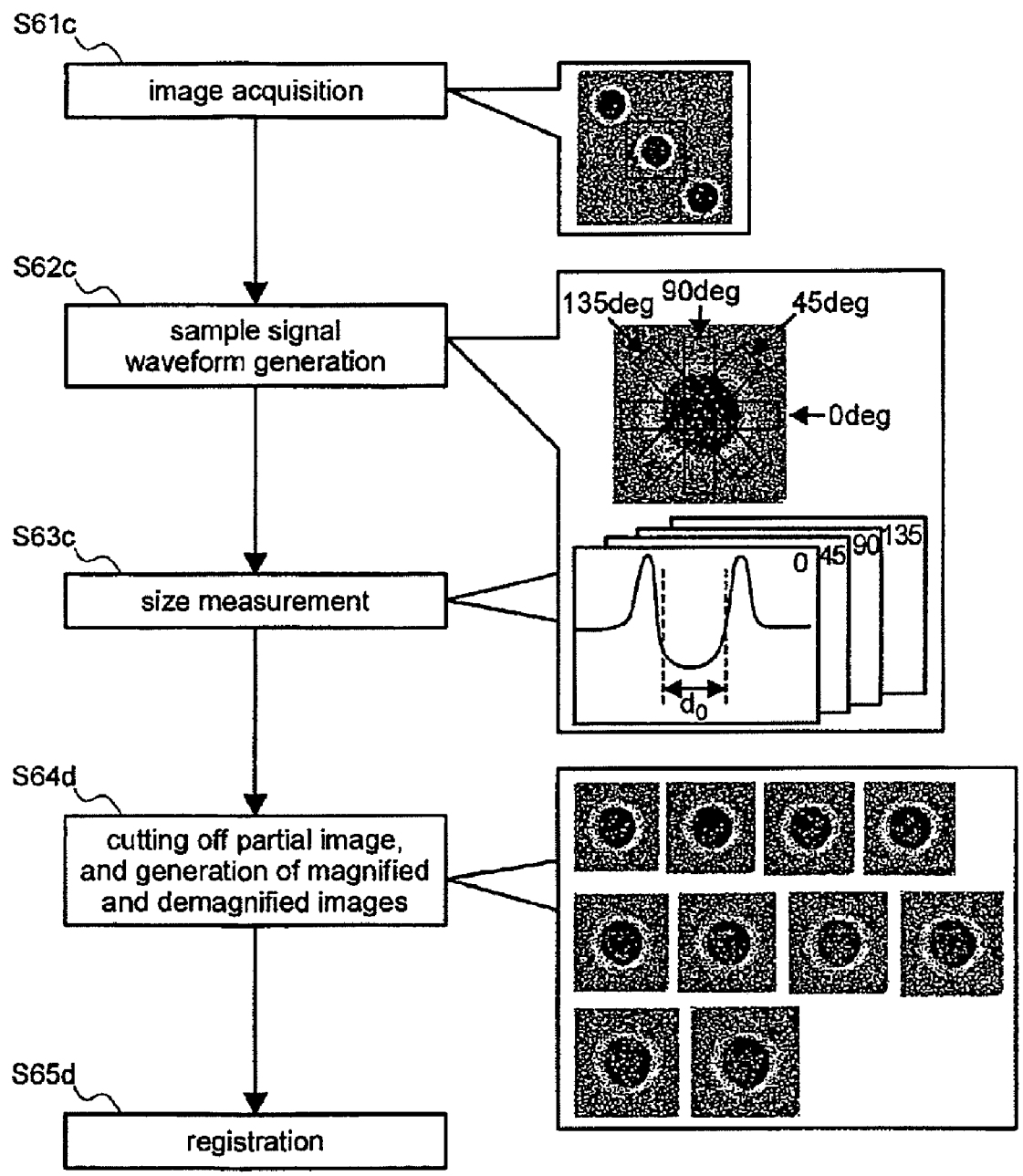
FIG. 17 is a flowchart in a hole pattern dimension measurement according to a sixth embodiment of the present invention.

This is another embodiment where the present invention is applied to the hole pattern dimension measurement. FIG. 17 is a flowchart describing the procedure of registration of the signal waveform obtained from a sample fabricated by the same fabrication process with the dimension measurement target sample. In this embodiment, a two-dimensional signal waveform, namely, an image, is registered. The SEM shown in FIG. 6 acquires an SEM image of the sample fabricated by the same fabrication process with the dimension measurement target sample (S61$c$) and stores it in the image memory 55. And, similar to the steps S61$a$-S63$a$ in FIG. 15, the signal waveform registration unit 512 performs hole dimension measurement, $d_i$ (i=0, 45, 90, 135), in four directions, i.e., 0-degree direction, 45-degree direction, 90-degree direction and 135-degree direction, on the attention hole surrounded by the rectangle frame on the drawing (S62$c$-S63$c$), and registers them to the memory device 55 for example together with the information about the sample and the information about the set measurement recipe. Next, the signal waveform registration unit 512 cuts the partial image including the attention hole, and generates reduced and magnified images thereof by Affine transformation (S64$d$). Then, it registers these reduced and magnified sample partial images to the memory device 55 for example (S65$d$).

Figure 18:
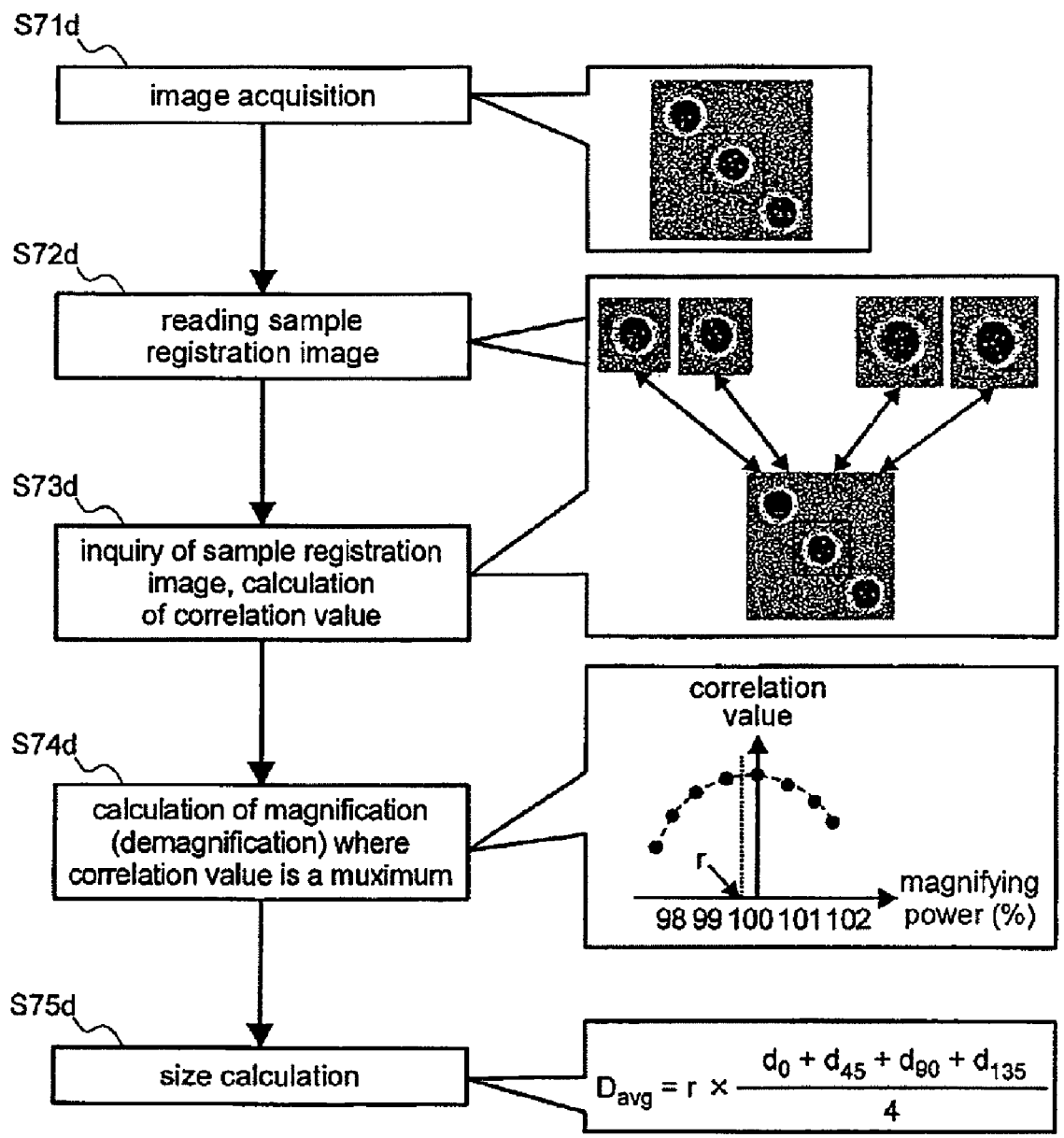
FIG. 18 is a flowchart in a hole pattern dimension measurement according to a sixth embodiment of the present invention.

FIG. 18 is a flowchart describing the procedure for measuring the hole dimension of the dimension measurement target of the dimension measurement target sample. The SEM shown in FIG. 5 acquires an SEM image of the dimension measurement target (S71$d$), and stores it in the image memory 53. The dimension calculation unit 513 reads the previously stored sample partial image group from the memory device 55 for example (S72$d$), and performs the combination with the hole of the dimension measurement target. As for the index, a correlation value for example is used. Moreover, the dimension calculation unit 513 obtains a magnification r where the correlation value is maximized (S74$d$), and multiplies it by the hole dimension $d_i$ (i=0, 45, 90, 135) measured in the step S63$c$ as follows (Equation 6) to obtain the hole dimension $D_{ave}$ of the measurement target (S75$d$).

$$D_{ave}=r\times((d_0+d_{45}+d_{90}+d_{135})/4) \quad \text{(Equation 6)}$$

Although an image including one hole is magnified or reduced in this embodiment, the hole may be divided into sector-shaped areas, and the position where the sector-shaped small image on the dimension measurement target image is scanned and combined may be obtained.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method for measuring a dimension of a pattern using a scanning electron microscope, the method comprising the steps of:
    imaging a sample pattern formed on a sample material based on measurement recipe;
    registering a partial waveform of the imaged sample signal waveform as a sample registration waveform;
    imaging a dimension measurement target pattern formed on a dimension measurement target sample based on the measurement recipe by using the electron microscope and thereby, acquiring a dimension measurement target pattern signal;
    forming a measurement target signal waveform based on the acquired dimension measurement target pattern signal;
    combining the measurement target signal waveform with the sample registration waveform; and
    calculating a dimension value of the dimension measurement target pattern based on the waveform combination result.

2. The method of claim 1, wherein, in the registration step, the sample registration waveform being registered is a partial waveform at an approximate waveform calculated by filtering the sample signal waveform.

3. The method of claim 1, wherein, in the registration step, the sample registration waveform being registered is a partial waveform at an approximate waveform calculated through the function application on the sample signal waveform.

4. The method of claim 1, wherein, in the registration step, partial waveforms of a plurality of approximate waveforms that are acquired by calculating the plural approximate waveforms through a filtering process on the sample signal waveform with different filter sizes are registered as the sample registration waveform; and in the dimension calculation step of the dimension measurement target pattern, the dimension of the dimension measurement target pattern is calculated on the basis of the best combination result among a plurality of combined waveforms between the partial waveforms of the plural approximate waveforms and the measurement target signal waveform.

5. The method of claim 1, wherein, in the registration step, approximate waveforms are calculated through the function application on the sample signal waveform, a plurality of reduced waveforms or enlarged waveforms by reducing or enlarging the approximate waveforms through coordinate transformation, and partial waveforms of the plural reduced or enlarged waveforms are registered as the sample registration waveform to be combined with the measurement target signal waveform; and in the dimension calculation step of the dimension measurement target pattern, the best waveform combination result among a plurality of combined waveforms between the plural reduced or enlarged partial waveforms and the measurement target signal waveform obtained as the result of waveform combination.

6. A method for measuring a dimension of a pattern using a scanning electron microscope, the method comprising the steps of:
    imaging a sample pattern by using the scanning, electron microscope based on measurement recipe, and acquiring a sample pattern signal therefrom;
    forming a one-dimensional or two-dimensional sample signal waveform based on the acquired sample pattern signal;
    registering a partial waveform of the sample signal waveform as a sample registration waveform;
    imaging a dimension measurement target pattern formed on a dimension measurement target sample by using the scanning electron microscope based on the measurement recipe, and acquiring a dimension measurement target pattern signal;
    forming measurement target signal waveforms at a plurality of spots based on the acquired dimension measurement target pattern signal;
    combining the plural measurement target signal waveforms with the sample registration waveform being registered in the signal waveform registration step; and calculating the amount of edge roughness of the dimension measurement target pattern based on the deviation at the plurality of spots in result of the waveform combination.

7. The method of claim 6, wherein, in the registration step, the sample registration waveform being registered is a partial waveform at an approximate waveform calculated by filtering the sample signal waveform.

8. The method of claim 6, wherein, in the registration step, the sample registration waveform being registered is a partial waveform at an approximate waveform calculated through the function application on the sample signal waveform.

9. The method of claim 6, wherein, in the registration step, partial waveforms of a plurality of approximate waveforms that are acquired by calculating the plural approximate waveforms through a filtering process on the sample signal waveform with different filter sizes are registered as the sample registration waveform; and in the dimension calculation step of the dimension measurement target pattern, the dimension of the dimension measurement target pattern is calculated on the basis of the best combination result among a plurality of combined waveforms between the partial waveforms of the plural approximate waveforms and the measurement target signal waveform.

10. The method of claim 6, wherein, in the registration step, approximate waveforms are calculated through the function application on the sample signal waveform, a plurality of reduced waveforms or enlarged waveforms by reducing or enlarging the approximate waveforms through coordinate transformation, and partial waveforms of the plural reduced or enlarged waveforms are registered as the sample registration waveform to be combined with the measurement target signal waveform; and in the dimension calculation step of the dimension measurement target pattern, the best waveform combination result among a plurality of combined waveforms between the plural reduced or enlarged partial waveforms and the measurement target signal waveform obtained as the result of waveform combination.

11. An apparatus for measuring a dimension using electron rays comprises:

imaging means for imaging the surface of a sample by radiating and scanning electron rays focused on the sample and detecting secondary electrons or reflected electrons generated from the sample;

a measurement recipe setup unit for storing a recipe used for the imaging means to image the sample;

signal waveform formation means for forming a signal waveform based on a pattern signal obtained by imaging a pattern formed on the sample using the imaging means based on the measurement recipe set by the measurement recipe setup unit;

sample registration waveform storage means for storing a partial waveform of the sample signal waveform as a sample registration waveform, in which the sample signal waveform is formed by the signal waveform formation means based on the sample pattern signal obtained by imaging the sample pattern formed on the sample material using the imaging means based on the measurement recipe set by the measurement recipe setup unit;

waveform combination means for combining the measurement target signal waveform formed by the signal waveform formation means with the sample registration waveform stored in the sample registration waveform storage means, in which the measurement target signal waveform is formed based on the dimension measurement target signal obtained by imaging the dimension measurement target pattern formed on the dimension measurement target sample by using the imaging means based on the measurement recipe set by the measurement recipe setup unit; and dimension calculation means for calculating a dimension of the dimension measurement target pattern based on the waveform combination result from the waveform combination means.

12. The apparatus of claim 11, wherein, in the dimension calculation means, the sample registration waveform to be combined with the measurement target signal waveform is a partial waveform at an approximate waveform calculated by filtering the sample signal waveform formed by the signal waveform formation means.

13. The apparatus of claim 11, wherein, in the dimension calculation means, the sample signal waveform to be combined with the measurement target signal waveform is a partial waveform at an approximate waveform calculated through the function application on the sample signal waveform formed by the signal waveform formation means.

14. The apparatus of claim 11, wherein, the sample registration waveform storage means stores partial waveforms of a plurality of approximate waveforms that are acquired by calculating the plural approximate waveforms through a filtering process on the sample signal waveform with different filter sizes as the sample registration waveform; and the dimension calculation means calculates a dimension of the dimension measurement target pattern on the basis of the best combination result among a plurality of combined waveforms between the partial waveforms of the plural approximate waveforms stored in the sample registration waveform storage means and the measurement target signal waveform.

15. The apparatus of claim 11, wherein, the sample registration waveform storage means stores a plurality of reduced waveforms or enlarged waveforms that are obtained by calculating approximate waveforms through function application on the sample signal waveform formed by the signal waveform formation means and by then reducing or enlarging the approximate waveforms through coordinate transformation; and the dimension calculation means uses the best waveform combination result among a plurality of combined waveforms between the plural reduced or enlarged partial waveforms and the measurement target signal waveform obtained as the result of waveform combination performed in the waveform combination means.

* * * * *